(12) United States Patent
Chandrashekar et al.

(10) Patent No.: US 8,385,689 B2
(45) Date of Patent: Feb. 26, 2013

(54) IMAGE ALIGNMENT USING TRANSLATION INVARIANT FEATURE MATCHING

(75) Inventors: Puneeth Bilagunda Chandrashekar, Bangalore (IN); Hemanth Kumar Sangappa, Bangalore (IN); Suresh Kirthi Kumaraswamy, Bangalore (IN)

(73) Assignee: MindTree Limited, Bangalore (IN)

( * ) Notice: Subject to any disclaimer, the term of this patent is extended or adjusted under 35 U.S.C. 154(b) by 716 days.

(21) Appl. No.: 12/633,784

(22) Filed: Dec. 8, 2009

(65) Prior Publication Data

US 2011/0091065 A1    Apr. 21, 2011

(30) Foreign Application Priority Data

Oct. 21, 2009    (IN) .......................... 2541/CHE/2009

(51) Int. Cl.
*G06K 9/36* (2006.01)
*G09G 5/00* (2006.01)

(52) U.S. Cl. ....................................... 382/294; 345/629

(58) Field of Classification Search ................... 382/284
See application file for complete search history.

(56) References Cited

U.S. PATENT DOCUMENTS

| | | | | |
|---|---|---|---|---|
| 5,602,944 | A | * | 2/1997 | Yokoyama et al. ............ 382/278 |
| 5,982,951 | A | * | 11/1999 | Katayama et al. ............. 382/284 |
| 6,005,987 | A | * | 12/1999 | Nakamura et al. ............ 382/294 |
| 6,178,265 | B1 | * | 1/2001 | Haghighi ....................... 382/236 |
| 6,359,617 | B1 | | 3/2002 | Xiong |
| 6,393,162 | B1 | * | 5/2002 | Higurashi ...................... 382/284 |
| 6,606,406 | B1 | | 8/2003 | Zhang et al. |
| 6,714,680 | B1 | * | 3/2004 | Sasada ........................... 382/216 |
| 6,798,923 | B1 | | 9/2004 | Hsieh et al. |
| 6,993,156 | B1 | | 1/2006 | Szeliski et al. |
| 7,127,090 | B2 | * | 10/2006 | Kreang-Arekul et al. ..... 382/128 |
| 2001/0055429 | A1 | * | 12/2001 | Hirosawa et al. .............. 382/284 |
| 2003/0179923 | A1 | * | 9/2003 | Xiong et al. ................... 382/154 |
| 2004/0036924 | A1 | * | 2/2004 | Ihara .............................. 358/3.28 |
| 2005/0286637 | A1 | * | 12/2005 | Nakamura et al. ........ 375/240.16 |
| 2007/0237421 | A1 | | 10/2007 | Luo et al. |
| 2008/0298718 | A1 | | 12/2008 | Liu et al. |

* cited by examiner

*Primary Examiner* — David Zarka
(74) *Attorney, Agent, or Firm* — Ash Tankha; Lipton, Weinberger & Husick

(57) ABSTRACT

A computer implemented method and system is provided for aligning multiple overlapping images in real time using translation invariant feature matching. A user captures overlapping images comprising a first image and a second image using one or more image capture devices. An image aligning application determines one or more local maxima pixel points and local minima pixel points in the first image and the second image based on predetermined statistical criteria. The image aligning application performs iterative intra image correlation in the first image for selecting a predetermined number of feature points. The image aligning application performs iterative inter image correlation for the selected feature points, for determining a predetermined number of best correlated feature point pairs, and selects a matching feature point pair from the best correlated feature point pairs. The image aligning application aligns the first image and the second image using the selected matching feature point pair.

25 Claims, 23 Drawing Sheets

1001                  1002

FIG. 14A
FIG. 14B 1001   1002

| PREDETERMINED SIZE OF THE DEFINED AREAS | LOCAL MINIMA PIXEL POINT | NORMALIZED CORRELATION COEFFICIENTS | | | THRESHOLD VALUES | | | RESULTANT CORRELATION COEFFICIENT |
|---|---|---|---|---|---|---|---|---|
| | | 3 | 5 | 7 | 3 | 5 | 7 | |
| | (36, 74) | 0.7673 | 0.5051 | 0.5675 | 0.875 | 0.875 | 0.875 | 0.6133 |
| | (36, 76) | 0.1423 | 0.2450 | 0.4002 | 0.875 | 0.875 | 0.875 | 0.2625 |
| | (36, 77) | 0.2287 | 0.3728 | 0.4386 | 0.875 | 0.875 | 0.875 | 0.3467 |
| | (43, 71) | 1.0000 | - | - | 0.875 | 0.875 | 0.875 | - |
| | (46, 72) | 0.0019 | 0.1056 | 0.1690 | 0.875 | 0.875 | 0.875 | 0.0922 |
| | (54, 72) | 1.0000 | - | - | 0.875 | 0.875 | 0.875 | - |
| | (58, 68) | 1.0000 | - | - | 0.875 | 0.875 | 0.875 | - |
| | (59, 65) | 1.0000 | - | - | 0.875 | 0.875 | 0.875 | - |
| | (77, 56) | 0.5135 | 0.5258 | 0.5152 | 0.875 | 0.875 | 0.875 | 0.5182 |

FIG. 18

| LOCAL MINIMA PIXEL POINT | BEST RESULTANT CORRELATION COEFFICIENT |
|---|---|
| (36, 74) | 0.7862 |
| (36, 76) | 0.6475 |
| (36, 77) | 0.7416 |
| (38, 73) | 0.6133 |
| (43, 71) | 0.5827 |
| (46, 72) | 0.6234 |
| (54, 72) | 0.6786 |
| (58, 68) | 0.7231 |
| (59, 65) | 0.7862 |
| (77, 56) | 0.6786 |

FIG. 19

| BLOCK NUMBER | BEST RESULTANT CORRELATION COEFFICIENT |
|---|---|
| 1 | 0.8318 |
| 2 | 0.7862 |
| 3 | 0.8507 |
| 4 | - |
| 5 | 0.863 |
| 6 | 0.7961 |

FIG. 20

| PREDETERMINED SIZE OF THE DEFINED FIRST AREA | LOCAL MINIMA PIXEL POINTS ON THE SECOND IMAGE | NORMALIZED CORRELATION COEFFICIENT | | | THRESHOLD VALUES | | | RESULTANT CORRELATION COEFFICIENT |
|---|---|---|---|---|---|---|---|---|
| | | 3 | 5 | 7 | 3 | 5 | 7 | |
| | (36, 76) | 0.0000 | - | - | 0.875 | 0.875 | 0.875 | - |
| | (38, 74) | 0.9394 | 0.8900 | 0.9121 | 0.875 | 0.875 | 0.875 | 0.9138 |
| | (45, 33) | 0.0000 | - | - | 0.875 | 0.875 | 0.875 | - |
| | (50, 74) | 0.0000 | - | - | 0.875 | 0.875 | 0.875 | - |

FIG. 21

| SERIAL NUMBER | FEATURE POINT IN THE FIRST IMAGE | CORRESPONDING DETERMINED LOCAL MINIMA PIXEL POINT IN THE SECOND IMAGE | RESULTANT CORRELATION COEFFICIENT |
|---|---|---|---|
| 1 | (38,73) | (38,74) | 0.9138 (1) |
| 2 | (54,72) | (53,74) | 0.9444 (2) |
| 3 | (224, 049) | (224,051) | 0.9433 (3) |
| 4 | (235, 048) | (235,050) | 0.9711 (4) |

FIG. 22

| BEST CORRELATED FEATURE POINT PAIR | VERTICAL OFFSET |
|---|---|
| 1 | 0 |
| 2 | 1 |
| 3 | 0 |
| 4 | 0 |

FIG. 23

| VERTICAL OFFSET | PROBABILITY |
|---|---|
| 0 | 0.75 |
| 1 | 0.25 |

FIG. 24

IMAGE ALIGNMENT USING TRANSLATION INVARIANT FEATURE MATCHING

CROSS REFERENCE TO RELATED APPLICATIONS

This application claims the benefit of non-provisional patent application number 2541/CHE/2009 titled "Image Alignment Using Translation Invariant Feature Matching", filed on Oct. 21, 2009 in the Indian Patent Office.

BACKGROUND

The computer implemented method and system disclosed herein, in general, relates to image processing. More particularly, the computer implemented method and system disclosed herein relates to aligning multiple overlapping images in real time using translation invariant feature matching.

Digital image capture is a well known technique used for capturing images using lower cost optical to electronic conversion devices. Advantages of using a digital image capture device is the ability to capture, store and immediately view an image, and the ability to correct defects in the saved image either in situ or later using a computer system. However, to cover wide space, large field view lenses are used resulting in barrel distortion effects on a resultant image which produces bending of space at the sides of the image. A single image capture device when used to obtain a wider field of view produces a low resolution image not useful for surveillance applications. The immediacy and correction ability of digital imaging has stimulated development of application programs that merge overlapping images together while correcting lens distortion, color and brightness across overlapping images.

Panoramic images have also been created using digital movie techniques, but these images are viewed over time rather than as an instantaneous presentation. Image aligning application programs rely upon the ability to locate the same objects appearing in overlapping images in order to provide alignment targets. Images that do not contain easily locatable objects in the overlapping region are problematic for aligning algorithms. Images captured from various camera positions contain local misalignments because of parallax and photometric inconsistencies due to differences in illumination and camera gain. Lenses with a field view exceeding 150 degrees are used for capturing wide images and produce barrel distortion effects on the image. Capturing a large field of view using a single camera also produces a low resolution image not usable in most applications. For example, surveillance applications require panoramic images to be generated in real time.

Image stabilization is a family of techniques for increasing stability of an image. The conventional image stabilization technique comprises optical image stabilization and electronic image stabilization. The optical image stabilization technique detects a rotational angle of a camera using a motion detection sensor, such as an angular velocity sensor and an acceleration sensor, and displaces a lens in an image pickup optical system and an image pickup device that photo electrically converts a subject image based on the rotational angle. Typically hand shake is sensed using one or more gyroscopic sensors and a floating lens element is moved using electromagnets. Such additional components are not feasible in mobile phone cameras due to size and weight, expense and power consumption. On the other hand, one of the electronic image stabilization techniques includes a method of detecting a motion vector between frame images in a motion picture, changes an output area in each frame image based on the motion vector, and obtains a stabilized motion picture image. However, a typical mobile device camera does not capture the appropriate images per second to reconstruct an image adequately and the image processing required to extrapolate a less blurred image is expensive and can increase power consumption. A need exists for a robust image stabilization technique that is repeatable under various conditions and relatively inexpensive.

Conventional techniques of image aligning process entire images due to lack of information regarding the sequence of the images prior to the processing and use wavelet techniques and other techniques, for example, scale invariant feature transform (SIFT) to solve for inter image translation and rotation, and are computationally expensive and difficult to achieve in real time. Therefore, there is a need for a technology that simplifies the relationship between images without leaving undesirable vestiges in the final image and that would greatly improve the speed and quality of aligned images.

Hence, there is an unmet need for an economic and computationally simple technique for aligning multiple images in real time using translation invariant feature matching.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for an economic and computationally simple technique for aligning multiple images in real time using translation invariant feature matching. A user captures multiple overlapping images comprising a first image and a second image using one or more image capture devices. Each of the overlapping images overlaps an adjacent image of the overlapping images. The first image and the second image are about the same scale. The first image and the second image are, for example, a pair of overlapping images, a pair of images comprising inter image jitter, etc. The image capture devices comprise one or more lenses of small aperture. In an embodiment, the sequence of aligning the images is known beforehand, thereby restricting the processing of the images to a selected region.

The computer implemented method and system disclosed herein provides an image aligning application for aligning the first image and the second image. In an embodiment, the image aligning application is installed in the image capture device and the image aligning application aligns the first image and the second image in the image capture device. In another embodiment, the user transfers the first image and the second image from the image capture devices to the image aligning application installed on a computing device via a network for alignment.

The image aligning application determines at least one of one or more local maxima pixel points and one or more local minima pixel points in a first region in the first image and a second region in the second image based on predetermined statistical criteria. The predetermined statistical criteria comprise, for example, absolute surrounding mean deviations of pixel intensities, maximum deviations of pixel intensities, etc. In an embodiment, the first region and the second region in combination constitute a region in common between the first image and the second image comprising a maximum number of similar discrete components. In an embodiment, the image aligning application modifies the first image and the second image prior to the determination of one or more local maxima pixel points and one or more local minima pixel points in the first image and the second image. The image aligning application modifies the first image and the second image for minimizing the effects of barrel distortion or noise on the first image and the second image.

After determining the local maxima pixel points and the local minima pixel points, the image aligning application performs iterative intra image correlation for at least one of the determined local maxima pixel points and the determined local minima pixel points in the first image for selecting a predetermined number of feature points. The feature points comprise at least one of one or more least correlated local maxima pixel points and one or more least correlated local minima pixel points. The image aligning application performs the iterative intra image correlation in a first mode or a second mode. In the first mode of performing iterative intra image correlation, the image aligning application defines one or more blocks of multiple predetermined sizes in the first region in the first image. As used herein, the term "block" refers to a region of defined boundaries of a predetermined geometrical shape in the first image. For various iterations of intra image correlation, the image aligning application defines one of multiple areas of one of multiple predetermined sizes around each of the determined local maxima pixel points and the determined local minima pixel points within each of the defined blocks. As used herein, the term "area" refers to a region of defined boundaries of a predetermined geometrical shape defined around each of the determined local maxima pixel points and each of the determined local minima pixel points. Further, the image aligning application correlates each of the defined areas around each of the determined local maxima pixel points with the defined areas around the determined local maxima pixel points and correlates each of the defined areas around each of the determined local minima pixel points with the defined areas around the determined local minima pixel points, within each of the defined blocks in the first region. The image aligning application iterates the correlation for the predetermined sizes of the defined areas. The number of iterations of the correlation is determined by a threshold value.

The image aligning application determines one or more resultant correlation coefficients based on the correlation involved in the iterative intra image correlation. Each of the determined resultant correlation coefficients represents a pair of local maxima pixel points whose defined areas are correlated or a pair of local minima pixel points whose defined areas are correlated. The image aligning application determines one or more best resultant correlation coefficients from the determined resultant correlation coefficients. Each of the determined best resultant correlation coefficients represents one of the determined local maxima pixel points or one of the determined local minima pixel points. The image aligning application determines a best resultant correlation coefficient from the determined best resultant correlation coefficients within each of the defined blocks. The determined best resultant correlation coefficient represents one of the defined blocks. The image aligning application determines a predetermined number of least correlated blocks from the defined blocks using the determined best resultant correlation coefficient of each of the defined blocks. The image aligning application selects the predetermined number of feature points comprising at least one of: one or more least correlated local maxima pixel points and one or more least correlated local minima pixel points from the determined least correlated blocks.

In the second mode of performing the iterative intra image correlation, the image aligning application defines one of multiple areas of one of multiple predetermined sizes around each of the determined local maxima pixel points and the determined local minima pixel points in the first region in the first image. The image aligning application correlates each of the defined areas around each of the determined local maxima pixel points with the defined areas around the determined local maxima pixel points in the first region, and correlates each of the defined areas around each of the determined local minima pixel points with the defined areas around the determined local minima pixel points in the first region. The image aligning application iterates the correlation for the predetermined sizes of the defined areas. The number of iterations of the correlation is determined by the threshold value.

The image aligning application determines one or more resultant correlation coefficients based on the correlation involved in the iterative intra image correlation. Each of the determined resultant correlation coefficients represents a pair of local maxima pixel points whose defined areas are correlated or a pair of local minima pixel points whose defined areas are correlated. The image aligning application determines one or more best resultant correlation coefficients from the determined resultant correlation coefficients. Each of the determined best resultant correlation coefficients represents one of the determined local maxima pixel points or one of the determined local minima pixel points. The image aligning application selects the predetermined number of feature points comprising at least one of: one or more least correlated local maxima pixel points and one or more least correlated local minima pixel points, using the determined best resultant correlation coefficients.

Further, the image aligning application performs iterative inter image correlation for the selected feature points, for determining a predetermined number of best correlated feature point pairs. The image aligning application defines a cell in the second region in the second image corresponding to spatial coordinates of each of the selected feature points in the first region in the first image. The image aligning application defines one of multiple first areas of one of multiple predetermined sizes around each of the selected feature points in the first region. Further, the image aligning application defines one of multiple second areas, of a predetermined size equal to the predetermined size of one of the defined first areas, around each of the determined local maxima pixel points or the determined local minima pixel points within each defined cell in the second region in the second image. The image aligning application correlates each of the defined first areas in the first region with one or more of the defined second areas within each defined cell in the second region based on spatial coordinates of each of the selected feature points. The image aligning application iterates the correlation for the predetermined sizes. The number of iterations of the correlation is determined by the threshold value. Prior to correlating, the image aligning application coincides each of the defined first areas with one of the defined second areas based on the spatial coordinates of the selected feature points, for compensating for horizontal translation or vertical translation between the first image and the second image, thereby rendering the inter image correlation to be translation invariant.

The image aligning application determines one or more resultant correlation coefficients based on the correlation involved in the iterative inter image correlation. Each of the determined resultant correlation coefficients represents one of the selected feature points in the first image and one of the determined local maxima pixel points or one of the determined local minima pixel points in the second image. The image aligning application determines one or more best resultant correlation coefficients from the determined resultant correlation coefficients. Each of the determined best resultant correlation coefficients represents one of the selected feature points in the first image and one of the determined local maxima pixel points or one of the determined local minima pixel points in the second image. The image aligning application determines a predetermined number of best correlated feature point pairs using the determined best resultant correlation coefficients. Each of the determined best correlated feature point pairs comprises one of the least correlated local maxima pixel points in the first image and one of the determined local maxima pixel points in the second image, or one of the least correlated local minima pixel points in the first image and one of the determined local minima pixel points in the second image.

The image aligning application selects a matching feature point pair from the determined best correlated feature point pairs. For selecting the matching feature point pair, the image aligning application calculates the probability of occurrence of a vertical offset value or a horizontal offset value of each of the determined best correlated feature point pairs. The image aligning application then groups the determined best correlated feature point pairs into one or more groups based on the calculated probability. The image aligning application selects a group comprising a maximum number of the best correlated feature point pairs from among the groups. The image aligning application selects one of the best correlated feature point pairs as the matching feature point pair from the selected group.

In an embodiment, the image aligning application performs the iterative intra image correlation and the iterative inter image correlation for the entire region of the first image and the entire region of the second image. Each of the iterative intra image correlation and the iterative inter image correlation is a normalized zero offset correlation. As used herein, the term "zero offset correlation" refers to correlation without sliding images such that the areas around the determined local maxima pixel points and the determined local minima pixel points considered for correlation overlap over one another exactly. The translation invariant inter image correlation renders the selection of the matching feature point pair to be unaffected by inter image translation. The image aligning application aligns the first image and the second image using the selected matching feature point pair. The image capture devices are positioned relative to one another in positions restraining rotation between the first image and the second image to a minimum.

In an embodiment, the image aligning application aligns the first image and the second image for creating a panoramic image. In this embodiment, the first region and the second region for determining the local maxima pixel points and the local minima pixel points is a first region of maximum overlap in the first image and a second region of maximum overlap in the second image respectively. For creating the panoramic image, the image aligning application superimposes the first image and the second image by concurrently positioning the selected matching feature point pair for obtaining a superimposed image. The image aligning application computes a width of an overlapping region in the superimposed image. Further, the image aligning application defines a sigmoid function for the second image and defines a reverse sigmoid function for the first image for the computed width. Furthermore, the image aligning application applies the sigmoid function and the reverse sigmoid function to the second image and the first image respectively at the overlapping region for creating the panoramic image.

In another embodiment, the image aligning application aligns the first image and the second image for creating a stabilized image. In this embodiment, a user captures the first image and the second image using one of the image capture devices. The first image and the second image comprise inter image jitter. The first region in the first image and the second region in the second image for determining the local maxima pixel points and the local minima pixel points are the entire region of the first image and the entire region of the second image respectively. For creating the stabilized image, the image aligning application displaces the second image with respect to the first image using the selected matching feature point pair for compensating for the inter image jitter.

The iterative intra image correlation and the iterative inter image correlation is performed in the first region in the first image and the second region in the second image alone, thereby providing an economic and a computationally simple technique of image alignment using translation invariant feature matching.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 14A-14B exemplarily illustrate a cell defined in the second region of maximum overlap in the second image corresponding to spatial coordinates of one of the selected feature points in the first region of maximum overlap in the first image.

FIG. 18 exemplarily illustrates the resultant correlation coefficients determined by performing iterative intra image correlation of one of the determined local minima pixel points with the other determined local minima pixel points within a defined block.

FIG. 19 exemplarily illustrates the best resultant correlation coefficients determined for the determined local minima pixel points within the defined block by performing iterative intra image correlation.

FIG. 20 exemplarily illustrates the best resultant correlation coefficients determined for the defined blocks in the first mode of performing iterative intra image correlation.

FIG. 21 exemplarily illustrates the resultant correlation coefficients obtained by performing iterative inter image correlation for one of the selected feature points.

FIG. 22 exemplarily illustrates the resultant correlation coefficients determined for each of the selected feature points.

FIG. 23 exemplarily illustrates a set of vertical offset values of the best correlated feature point pairs calculated by the image aligning application.

FIG. 24 exemplarily illustrates the calculated probabilities of the best correlated feature point pairs.

DETAILED DESCRIPTION OF THE INVENTION

Figure 1:
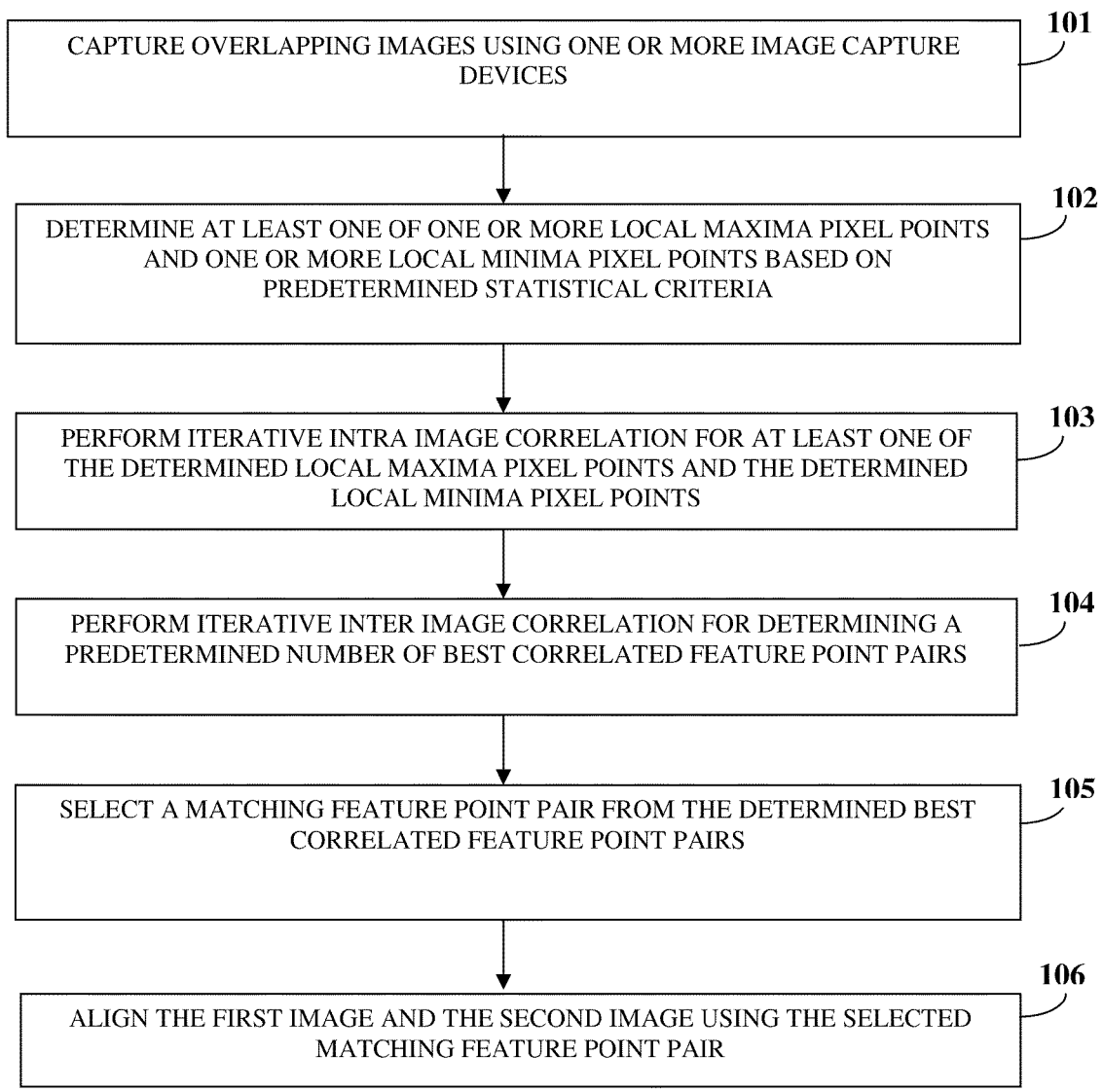
FIG. 1 illustrates a computer implemented method of aligning multiple overlapping images in real time using translation invariant feature matching.

FIG. 1 illustrates a computer implemented method of aligning multiple overlapping images in real time using translation invariant feature matching. Each of the overlapping images overlaps an adjacent image of the overlapping images. A user captures 101 overlapping images comprising, for example, a first image and a second image using one or more image capture devices. For purposes of illustration, the detailed description refers to a first image and a second image; however the scope of the computer implemented method and system disclosed herein is not limited to the first image and the second image but may be extended to include an almost unlimited number of images. In the computer implemented method and system disclosed herein, the first image and the second image are about the same scale. The first image and the second image are, for example, a pair of overlapping images, a pair of images comprising inter image jitter, etc. The image capture devices are, for example, cameras, mobile phones, mobile computing devices, laptops, personal computers, personal digital assistants, etc. The image capture devices are positioned relative to one another in positions that restrain rotation between the images. In the computer implemented method disclosed herein, the sequence of images is known, thereby restricting the processing of the images to a first region in the first image and a second region in the second image.

An image aligning application is provided for aligning the first image and the second image. In an embodiment, the image aligning application is installed in the image capture devices for aligning the captured first image and the captured second image. In another embodiment, the user transfers the first image and the second image from the image capture devices to the image aligning application installed on a computing device via a network for the alignment. The network is, for example, a wireless communication network or a wired communication network. The image aligning application determines 102 at least one of one or more local maxima pixel points and one or more local minima pixel points in a first region in the first image and a second region in the second image based on predetermined statistical criteria. As used herein, the term "maxima pixel point" refers to a pixel point possessing a value of intensity higher than the surrounding pixel points. As used herein, the term "minima pixel point" refers to a pixel point possessing a value of intensity lower than the surrounding pixel points. The predetermined statistical criteria comprise, for example, absolute surrounding mean deviations of pixel intensities, maximum deviations of pixel intensities, etc. As used herein, the term "absolute surrounding mean deviation" refers to an absolute value of mean deviation of the value of intensity of each pixel point relative to the pixel points in the vicinity.

In an embodiment, the image aligning application modifies the first image and the second image prior to the determination of one or more local maxima pixel points and one or more local minima pixel points in the first image and the second image. The image aligning application modifies the first image and the second image for minimizing the effects of barrel distortion or noise on the first image and the second image. The image aligning application modifies the first image and the second image by, for example, using image enhancement techniques, using low pass filtering techniques, using barrel distortion correction techniques, resizing the first image and the second image, intra image differencing, etc. After determining the local maxima pixel points and the local minima pixel points, the image aligning application performs iterative intra image correlation 103 for at least one of the determined local maxima pixel points and the determined local minima pixel points in the first region in the first image. The image aligning application performs the iterative intra image correlation in a first mode or a second mode as explained in the detailed descriptions of FIG. 2 and FIG. 3 respectively.

Figure 2:
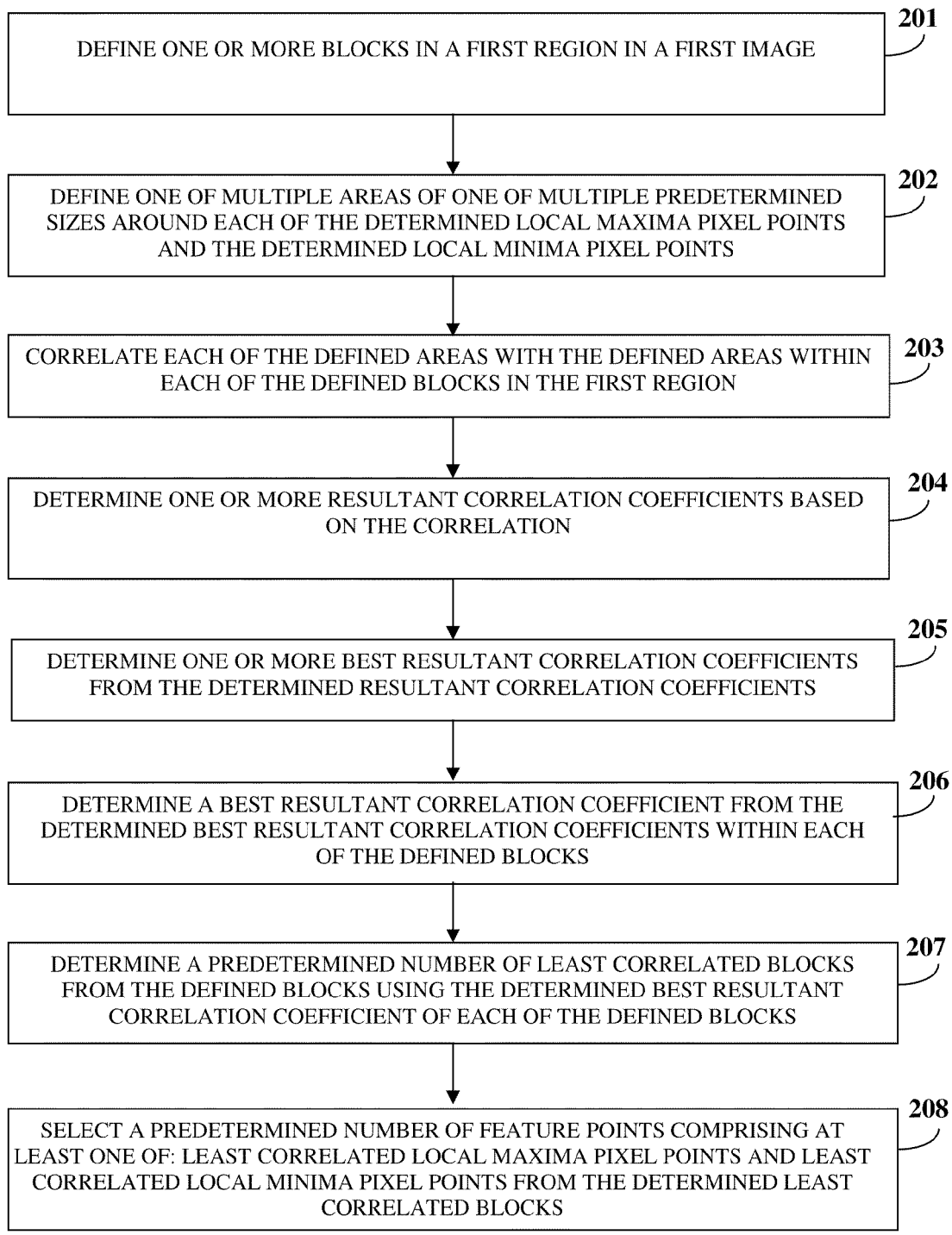
FIG. 2 illustrates a computer implemented method of performing intra image correlation in a first mode.

FIG. 2 illustrates a computer implemented method of performing intra image correlation in the first mode. In the first mode, the image aligning application defines 201 one or more blocks in the first region in the first image. As used herein, the term "block" refers to a region of defined boundaries of a predetermined geometrical shape in the first image. In an embodiment, the image aligning application defines blocks around each of the local maxima pixel points and each of the local minima pixel points. The blocks are of multiple predetermined sizes. For various iterations of intra image correlation, the image aligning application defines 202 one of multiple areas of one of multiple predetermined sizes around each of the determined local maxima pixel points and the determined local minima pixel points within each of the defined blocks. As used herein, the term "area" refers to a region of defined boundaries of a predetermined geometrical shape around the determined local maxima pixel points and the determined local minima pixel points. The image aligning application correlates 203 each of the defined areas around each of the determined local maxima pixel points with the defined areas around the determined local maxima pixel points within each of the defined blocks in the first region and correlates 203 each of the defined areas around each of the determined local minima pixel points with the defined areas around the determined local minima pixel points, within each of the defined blocks in the first region.

For each intra image correlation, the image aligning application determines a correlation coefficient using, for example, the formula:

$$ss_{xx} = \sum_{0}^{M-1} x_i^2 - u\overline{x}^2,$$

$$ss_{yy} = \sum_{0}^{M-1} y_i^2 - n\overline{y}^2,$$

where i varies from 0 to M−1, where M is the predetermined size of the defined areas, and $x_i$ and $y_i$ are the pixels within the defined areas, $$ss_{xy} = \sum_{0}^{M-1} x_i y_i - n\overline{x} * \overline{y},$$

Coefficient of correlation=$ss_{xy}$/sqrt ($ss_{xx}*ss_{yy}$)

The image aligning application iterates the correlation involved in the iterative intra image correlation for the predetermined sizes of the defined areas. The number of iterations of the correlation is determined by a threshold value. After each of the iterations, the image aligning application compares the value of each of the correlation coefficients with the threshold value. If the value is equal to the threshold value or below the threshold value, then the user continues to perform successive correlations for different predetermined sizes of the defined areas. If the value is greater than the threshold value, the image aligning application terminates the correlation for the concerned local maxima pixel point or the local minima pixel point for different predetermined sizes of the defined areas. In the computer implemented method disclosed herein, the threshold value is constant or varies with the predetermined sizes. The image aligning application determines 204 one or more resultant correlation coefficients using the determined correlation coefficients. The image aligning application determines each of the determined resultant correlation coefficients by calculating the mean of the correlation coefficients or by using other statistical criteria, for example, standard deviation of the correlation coefficients, mean deviation of the correlation coefficients, etc. Each of the determined resultant correlation coefficients represents a pair of local maxima pixel points whose defined areas are correlated or a pair of local minima pixel points whose defined areas are correlated.

The image aligning application determines 205 one or more best resultant correlation coefficients from the determined resultant correlation coefficients. Each of the determined best resultant correlation coefficients represents one of the determined local maxima pixel points or one of the determined local minima pixel points. The image aligning application determines 206 a best resultant correlation coefficient from the determined best resultant correlation coefficients within each of the defined blocks. The determined best resultant correlation coefficient represents one of the defined blocks. The image aligning application determines 207 a predetermined number of least correlated blocks from the defined blocks using the determined best resultant correlation coefficient of each of the defined blocks. The image aligning application selects 208 a predetermined number of feature points comprising at least one of one or more least correlated local maxima pixel points and one or more least correlated local minima pixel points from the determined least correlated blocks.

Figure 3:
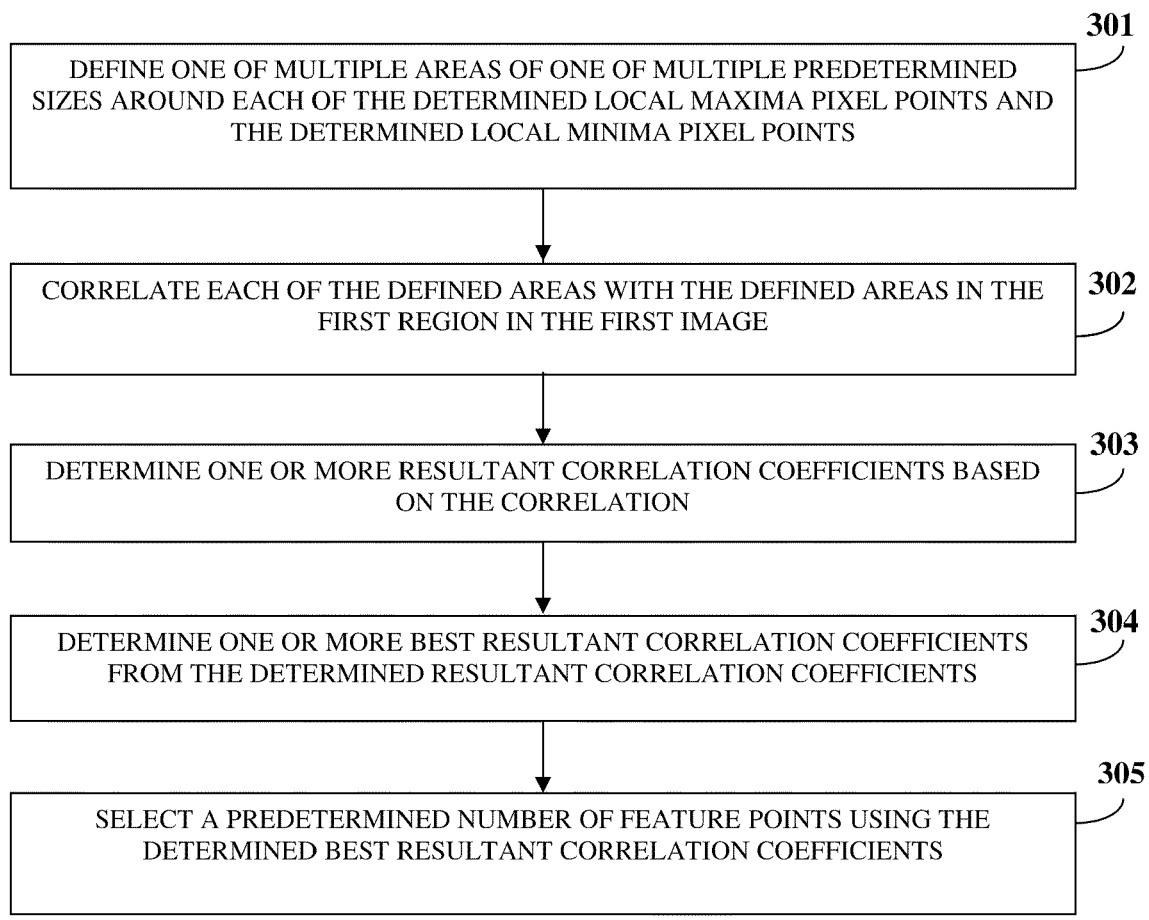
FIG. 3 illustrates a computer implemented method of performing intra image correlation in a second mode.

FIG. 3 illustrates a computer implemented method of performing intra image correlation in the second mode. In the second mode, the image aligning application defines 301 one of multiple areas of one of multiple predetermined sizes around each of the determined local maxima pixel points and the determined local minima pixel points in the first region in the first image. The image aligning application correlates 302 each of the defined areas around each of the determined local maxima pixel points with the defined areas around the determined local maxima pixel points in the first region, and correlates 302 each of the defined areas around each of the determined local minima pixel points with the defined areas around the determined local minima pixel points in the first region.

For each correlation, the image aligning application determines a correlation coefficient using, for example, the formula provided in the detailed description of FIG. 2. The image aligning application iterates the correlation for the predetermined sizes of the defined areas. The number of iterations of the correlation is determined by the threshold value in the second mode as in the first mode explained in the detailed description of FIG. 2. The image aligning application determines 303 one or more resultant correlation coefficients based on the correlation. Each of the determined resultant correlation coefficients represents one of a pair of local maxima pixel points whose defined areas are correlated and a pair of local minima pixel points whose defined areas are correlated. The image aligning application determines the resultant correlation coefficients either by calculating the statistical mean of the correlation coefficients or by using other statistical criteria, for example, standard deviation of the correlation coefficients, mean deviation of the correlation coefficients, etc. The image aligning application determines 304 one or more best resultant correlation coefficients from the determined resultant correlation coefficients. Each of the determined best resultant correlation coefficients represents one of the determined local maxima pixel points or one of the determined local minima pixel points. The image aligning application selects 305 the predetermined number of feature points using the determined best resultant correlation coefficients. The selected feature points comprise at least one of one or more least correlated local maxima pixel points and one or more least correlated local minima pixel points in the first image.

Figure 4:
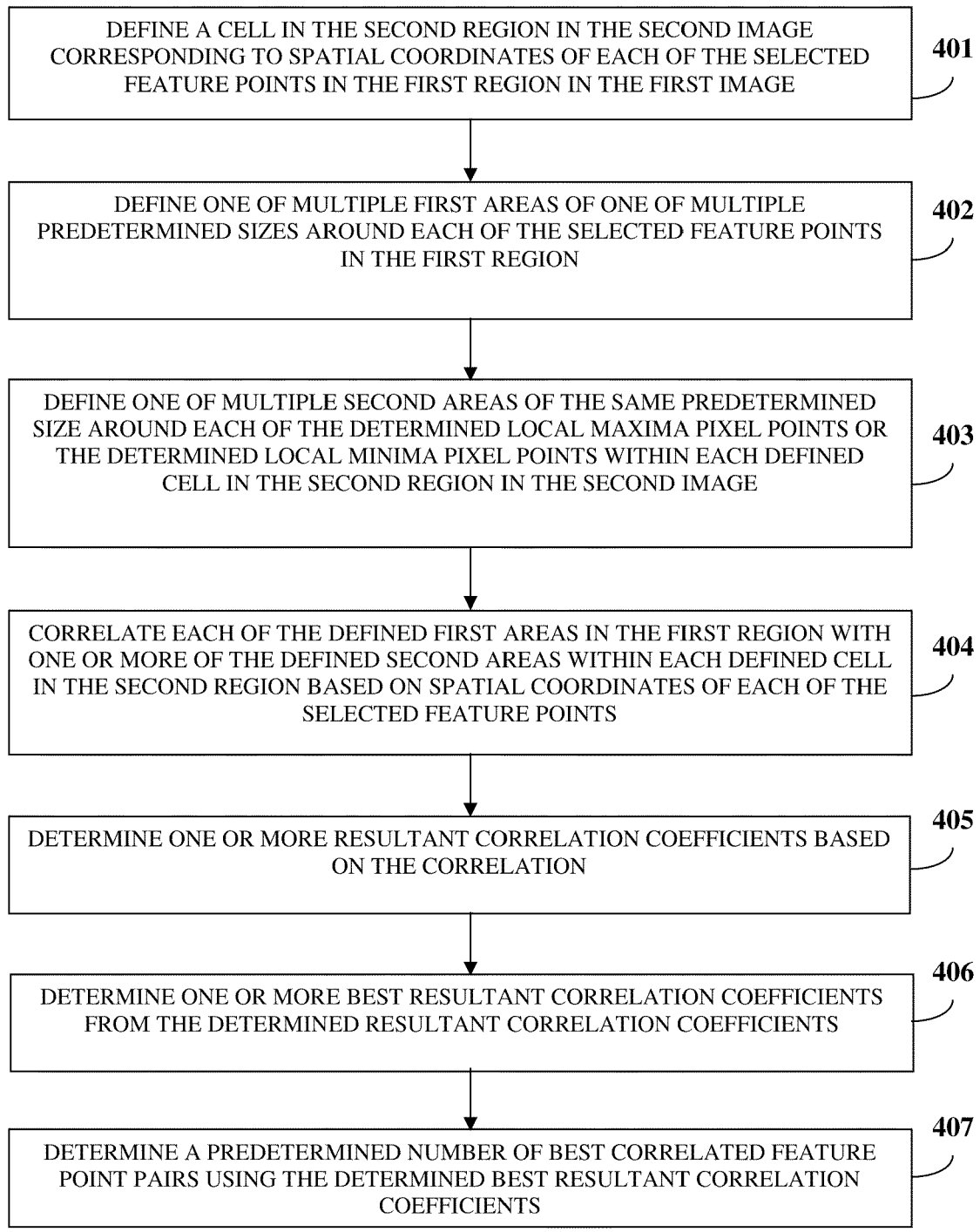
FIG. 4 illustrates a computer implemented method of performing inter image correlation.

The image aligning application uses the feature points selected via the first mode or the second mode for performing iterative inter image correlation 104. FIG. 4 illustrates a computer implemented method of performing inter image correlation for the selected feature points. In inter image correlation, the image aligning application defines 401 a cell in the second region in the second image corresponding to spatial coordinates of each of the selected feature points in the first region in the first image. The image aligning application defines 402 one of multiple first areas of one of multiple predetermined sizes around each of the selected feature points in the first region. The image aligning application defines 403 one of multiple second areas, of a predetermined size equal to the predetermined size of the defined first areas, around each of the determined local maxima pixel points or the determined local minima pixel points within each defined cell in the second region in the second image. The image aligning application correlates 404 each of the defined first areas in the first region with one or more of the defined second areas within each defined cell in the second region, based on spatial coordinates of each of the selected feature points in the first region. For example, if the selected feature point is a least correlated local minima pixel point in the first region, then the image aligning application correlates a first area defined around the least correlated local minima pixel point in the first region with second areas defined around the determined local minima pixel points within a defined cell in the second region corresponding to the spatial coordinates of the least correlated local minima pixel point in the first region. Similarly, if the selected feature point is a least correlated local maxima pixel point in the first region, then the image aligning application correlates a first area defined around the least correlated local maxima pixel point in the first region with second areas defined around the determined local maxima pixel points within a defined cell in the second region corresponding to the spatial coordinates of the least correlated local maxima pixel point in the first region.

The image aligning application iterates the correlation involved in the iterative inter image correlation for the predetermined sizes. The number of iterations of the correlation is determined by the threshold value. Prior to correlating, the image aligning application coincides each of the defined first areas with one of the defined second areas based on the spatial coordinates of the selected feature points, for compensating for horizontal translation or vertical translation between the first image and the second image, thereby rendering the inter image correlation to be translation invariant. After each of the iterations, the image aligning application determines a correlation coefficient using, for example, the formula provided in the detailed description of FIG. 2. The image aligning application determines 405 one or more resultant correlation coefficients using each of the correlation coefficients determined for each of the iterations. The image aligning application determines the resultant correlation coefficients either by calculating the statistical mean of the correlation coefficients or by using other statistical criteria for example, standard deviation of the correlation coefficients, mean deviation of the correlation coefficients, etc. Each of the determined resultant correlation coefficients represents one of the selected feature points in the first image and one of the determined local maxima pixel points or one of the determined local minima pixel points in the second image.

The image aligning application determines 406 one or more best resultant correlation coefficients from the determined resultant correlation coefficients. Each of the determined best resultant correlation coefficients represents one of the selected feature points in the first image and one of the determined local maxima pixel points or one of the determined local minima pixel points in the second image. The image aligning application then determines 407 a predetermined number of best correlated feature point pairs using the determined best resultant correlation coefficients. Each of the determined best correlated feature point pairs comprises one of the least correlated local maxima pixel points in the first image and one of the determined local maxima pixel points in the second image, or one of the least correlated local minima pixel points in the first image and one of the determined local minima pixel points in the second image.

In the computer implemented method and system disclosed herein, each of the iterative intra image correlation and the iterative inter image correlation is a normalized zero offset correlation. As used herein, the term "zero offset correlation" refers to correlation without sliding images such that the areas around the determined local maxima pixel points and the determined local minima pixel points considered for correlation overlap over one another exactly. For purposes of illustration, the detailed description refers to a normalized zero offset correlation; however the scope of the computer implemented method and system disclosed herein is not limited to the normalized zero offset correlation but may be extended to include any other correlation techniques.

Figure 5:
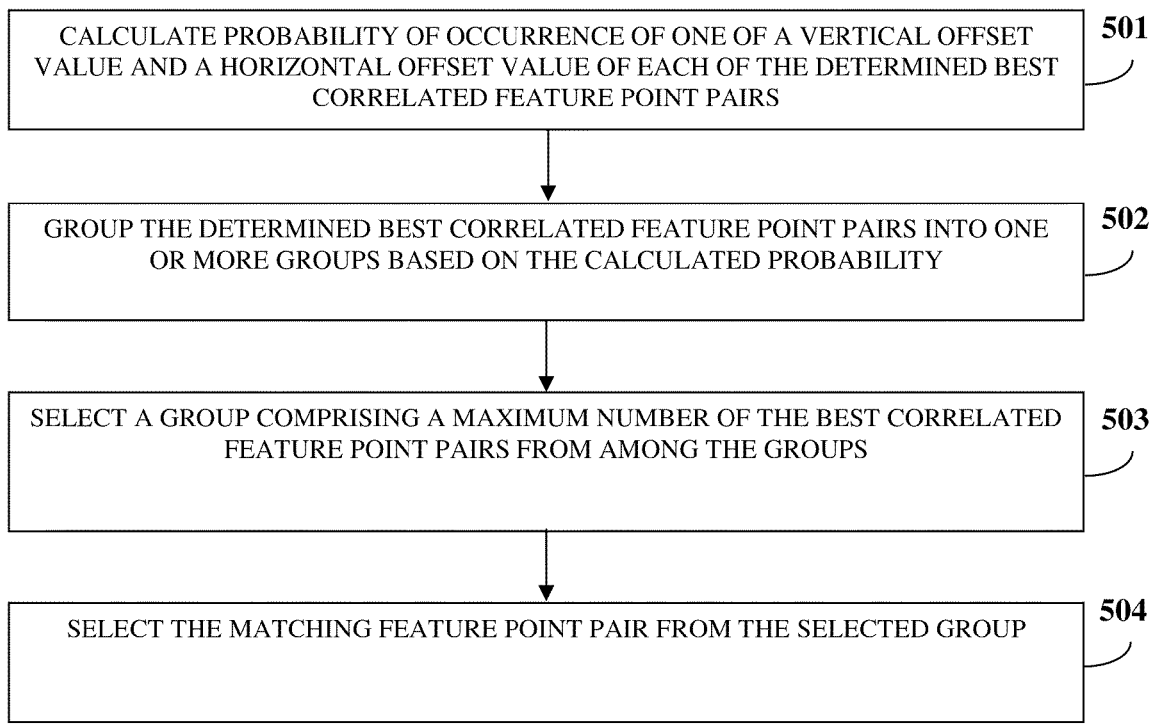
FIG. 5 illustrates a computer implemented method of selecting a matching feature point pair.

After determining the predetermined number of best correlated feature point pairs using the determined best resultant correlation coefficients, the image aligning application selects 105 a matching feature point pair from the determined best correlated feature point pairs as explained in the detailed description of FIG. 5.

FIG. 5 illustrates a computer implemented method of selecting a matching feature point pair. The image aligning application selects the matching feature point pair from the best correlated feature point pairs based on a probability of occurrence of a vertical offset or a horizontal offset. For selecting the matching feature point pair, the image aligning application calculates 501 the probability of occurrence of the vertical offset value or the horizontal offset value of each of the determined best correlated feature point pairs. The image aligning application groups 502 the determined best correlated feature point pairs into one or more groups based on the calculated probability. From among the groups, the image aligning application selects 503 a group comprising a maximum number of the best correlated feature point pairs. The group comprising the maximum number of the best correlated feature point pairs is herein referred to as a "highest probability group". The image aligning application selects 504 one of the best correlated feature point pairs as the matching feature point pair from the selected group. The translation invariant inter image correlation renders the selection of the matching feature point pair to be unaffected by inter image translation. The image capture devices are positioned relative to one another in positions restraining rotation between the first image and the second image to a minimum.

In an embodiment, the image aligning application selects one or more determined local maxima pixel points and one or more determined local minima pixel points and defines one or more blocks in regions around the selected determined local maxima pixel points or the selected determined local minima pixel points. In this embodiment, the image aligning application performs iterative intra image correlation in the first mode as explained in the detailed description of FIGS. 1-2. The image aligning application performs the intra image correlation for a single determined local maxima pixel point with other determined local maxima pixel points within the defined block or for a single determined local minima pixel point with other determined local minima pixel points within the defined block. The image aligning application determines a single best resultant correlation coefficient for each defined block. The determined best resultant correlation coefficient represents the selected determined local maxima pixel point or the selected determined local minima pixel point and thereby represents the defined block.

The image aligning application uses the determined best resultant correlation coefficient of each defined block for determining a predetermined number of least correlated blocks from among the defined blocks. After determining the least correlated blocks, the image aligning application selects a predetermined number of feature points comprising at least one of one or more least correlated local maxima pixel points and one or more least correlated local minima pixel points from the determined least correlated blocks. The image aligning application then performs iterative inter image correlation, followed by the selection of a matching feature point pair as explained in the detailed descriptions of FIGS. 4-5.

The image aligning application then aligns 106 the first image and the second image using the selected matching feature point pair.

Figure 6:
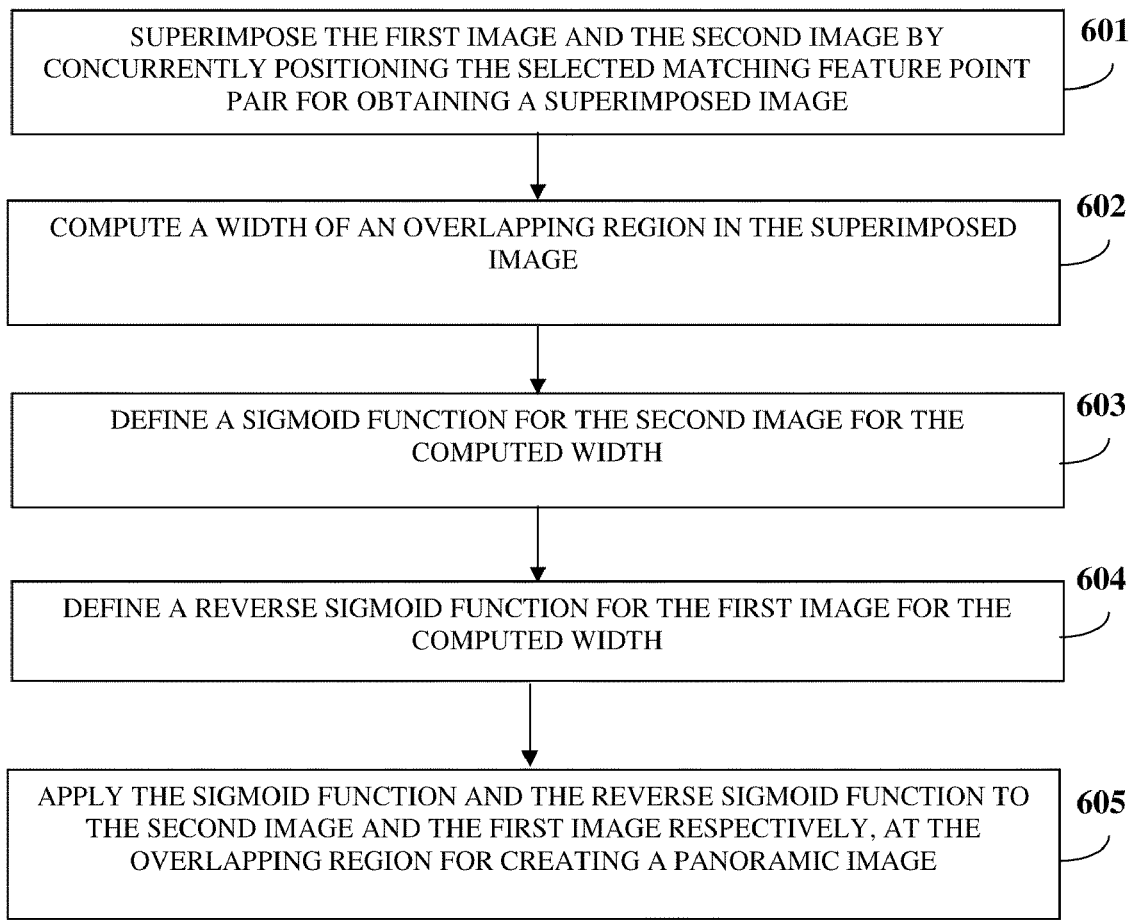
FIG. 6 illustrates a computer implemented method of creating a panoramic image by aligning a first image and a second image using translation invariant feature matching.

In an embodiment, the image aligning application aligns the first image and the second image using the selected matching feature point pair for creating a panoramic image as explained in the detailed description of FIG. 6. In this embodiment, the first region and the second region for determining the local maxima pixel points and the local minima pixel points are a first region of maximum overlap in the first image and a second region of maximum overlap in the second image respectively. As used herein, a region of maximum overlap refers to a region in common between the first image and the second image comprising a maximum number of similar discrete components. The image aligning application selects the matching feature point pair as explained in the detailed descriptions of the FIGS. 1-5. In this embodiment, during selecting matching feature point pair, the image aligning application calculates the probability of occurrence of a vertical offset value for creating a horizontal panorama or calculates the probability of occurrence of a horizontal offset value for creating a vertical panorama. For creating a mosaic panorama, the image aligning application calculates the probability of occurrence of the horizontal offset or the vertical offset for each of the determined best correlated feature point pairs.

FIG. 6 illustrates a computer implemented method of creating a panoramic image by aligning a first image and a second image using translation invariant feature matching. The image aligning application superimposes 601 the first image and the second image by concurrently positioning the matching feature point pair for obtaining a superimposed image. The image aligning application computes 602 a width of an overlapping region in the superimposed image. Further, the image aligning application defines 603 a sigmoid function for the second image and defines 604 a reverse sigmoid function for the first image, for the computed width. The image aligning application then applies 605 the sigmoid function and the reverse sigmoid function to the second image and the first image respectively at the overlapping region for creating the panoramic image.

In another embodiment, the image aligning application aligns the first image and the second image for creating a stabilized image. In this embodiment, a user captures the first image and the second image using one of the image capture devices positioned rigidly so as to restrain rotation between the pair of images to nil. The first image and the second image comprise inter image jitter. The inter image jitter is caused, for example, due to vibrations during capture of the first image and the second image. The first region in the first image and the second region in the second image for determining the local maxima pixel points and the local minima pixel points are the entire region of the first image and the entire region of the second image, respectively. The image aligning application selects a matching feature point pair for aligning the first image and the second image as explained in the detailed description of FIGS. 1-5.

The determined local maxima pixel points and the determined local minima pixel points in the second image are displaced in space with respect to the corresponding determined local maxima pixel points and the corresponding determined local minima pixel points in the first image due to vibrations during capture of the second image and the first image respectively. The spatially displaced local maxima pixel points and the local minima pixel points in the second image constitute the inter image jitter. After selecting the matching feature point pair as explained in the detailed description of FIG. 5, the image aligning application displaces the second image with respect to the first image using the selected matching feature point pair for compensating for the inter image jitter. The second image and the first image are made to coincide at the selected matching feature point pair. The displacement by the image aligning application negates spatial displacements between the corresponding determined local maxima pixel points in the first image and the second image and negates the spatial displacement between the corresponding determined local minima pixel points in the first image and the second image, thereby creating a stabilized image devoid of spatial displacements.

For purposes of illustration, the detailed description refers to aligning images for creating a panoramic image and a stabilized image; however the scope of the computer implemented method and system disclosed herein is not limited to creation of the panoramic image and the stabilized image but may be extended to other applications involving image alignment.

Figure 7:
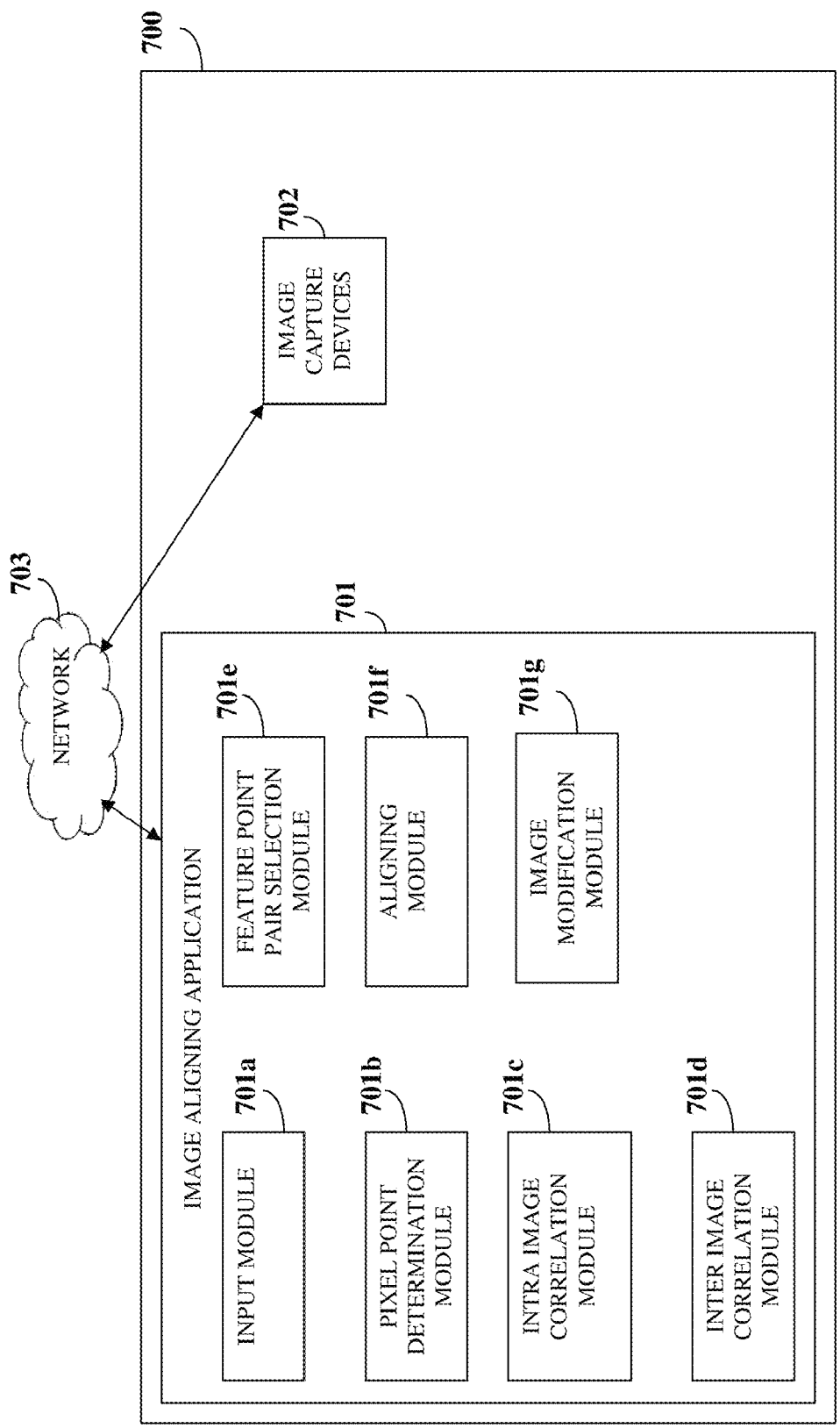
FIG. 7 illustrates a computer implemented system for aligning multiple overlapping images in real time using translation invariant feature matching.

FIG. 7 illustrates a computer implemented system 700 for aligning multiple overlapping images in real time using translation invariant feature matching. The computer implemented system 700 comprises one or more image capture devices 702 and an image aligning application 701. The image capture devices 702 capture multiple overlapping images comprising, for example, a first image and a second image. The image capture device 702 is, for example, a digital camera, a personnel computer, a laptop, a personal digital assistant (PDA), a mobile phone, a mobile computing device, etc. The image aligning application 701 aligns the captured overlapping images. The image aligning application 701 comprises an input module 701a, a pixel point determination module 701b, an intra image correlation module 701c, an inter image correlation module 701d, a feature point pair selection module 701e, an aligning module 701f, and an image modification module 701g. The input module 701a accepts the captured overlapping images from the image capture devices 702 via a network 703. The input module 701a is, for example, a computer interface. The pixel point determination module 701b determines at least one of one or more local maxima pixel points and one or more local minima pixel points in a first region in the first image and a second region in the second image based on the predetermined statistical criteria. The image modification module 701g modifies the first image and the second image prior to the determination of one or more local maxima pixel points and one or more local minima pixel points in the first image and the second image. The image modification module 701g modifies the first image and the second image for minimizing effects of barrel distortion and noise on the first image and the second image.

The intra image correlation module 701c performs iterative intra image correlation for at least one of the determined local maxima pixel points and the determined local minima pixel points in the first image for selecting a predetermined number of feature points. The selected feature points comprise at least one of: one or more least correlated local maxima pixel points and one or more least correlated local minima pixel points. The intra image correlation module 701c performs the iterative intra image correlation in a first mode or a second mode as explained in the detailed description of FIG. 2 and FIG. 3 respectively.

The inter image correlation module 701d performs iterative inter image correlation for the selected feature points, for determining a predetermined number of best correlated feature point pairs as explained in the detailed description of FIG. 4. Each of the determined best correlated feature point pairs comprises one of the selected feature points in the first image and one of the determined local maxima pixel points or one of the determined local minima pixel points in the second image.

In an embodiment, the image aligning application 701 performs the iterative intra image correlation and the iterative inter image correlation for the entire region of the first image and the entire region of the second image not restricting the iterative intra image correlation and the iterative inter image correlation to the first region and the second region of maximum overlap. The feature point pair selection module 701e selects a matching feature point pair from the determined best correlated feature point pairs as explained in the detailed description of FIG. 5.

The aligning module 701f aligns the first image and the second image using the selected matching feature point pair. In an embodiment, the aligning module 701f aligns the first image and the second image captured using the image capture devices 702 for creating a panoramic image as explained in the detailed descriptions of FIG. 6. In this embodiment, the aligning module 701f superimposes the first image and the second image by concurrently positioning the selected matching feature point pair over one another for obtaining a superimposed image. Further, the aligning module 701f computes a width of an overlapping region in the superimposed image. The aligning module 701f defines a sigmoid function for the second image for the computed width. The aligning module 701f defines a reverse sigmoid function for the first image for the computed width. The aligning module 701f applies the sigmoid function and the reverse sigmoid function to the second image and the first image respectively at the overlapping region for creating the panoramic image.

In another embodiment, the aligning module 701f aligns creates a stabilized image from the first image and the second image captured using one of the image capture devices 702. The first image and the second image comprise inter image jitter. The first region in the first image and the second region in the second image for determining one or more local maxima pixel points and one or more local minima pixel points are the entire region of the first image and the entire region of the second image respectively. The aligning module 701f displaces the second image with respect to the first image using the selected matching feature point pair for compensating for the inter image jitter, thereby creating the stabilized image.

Figure 8:
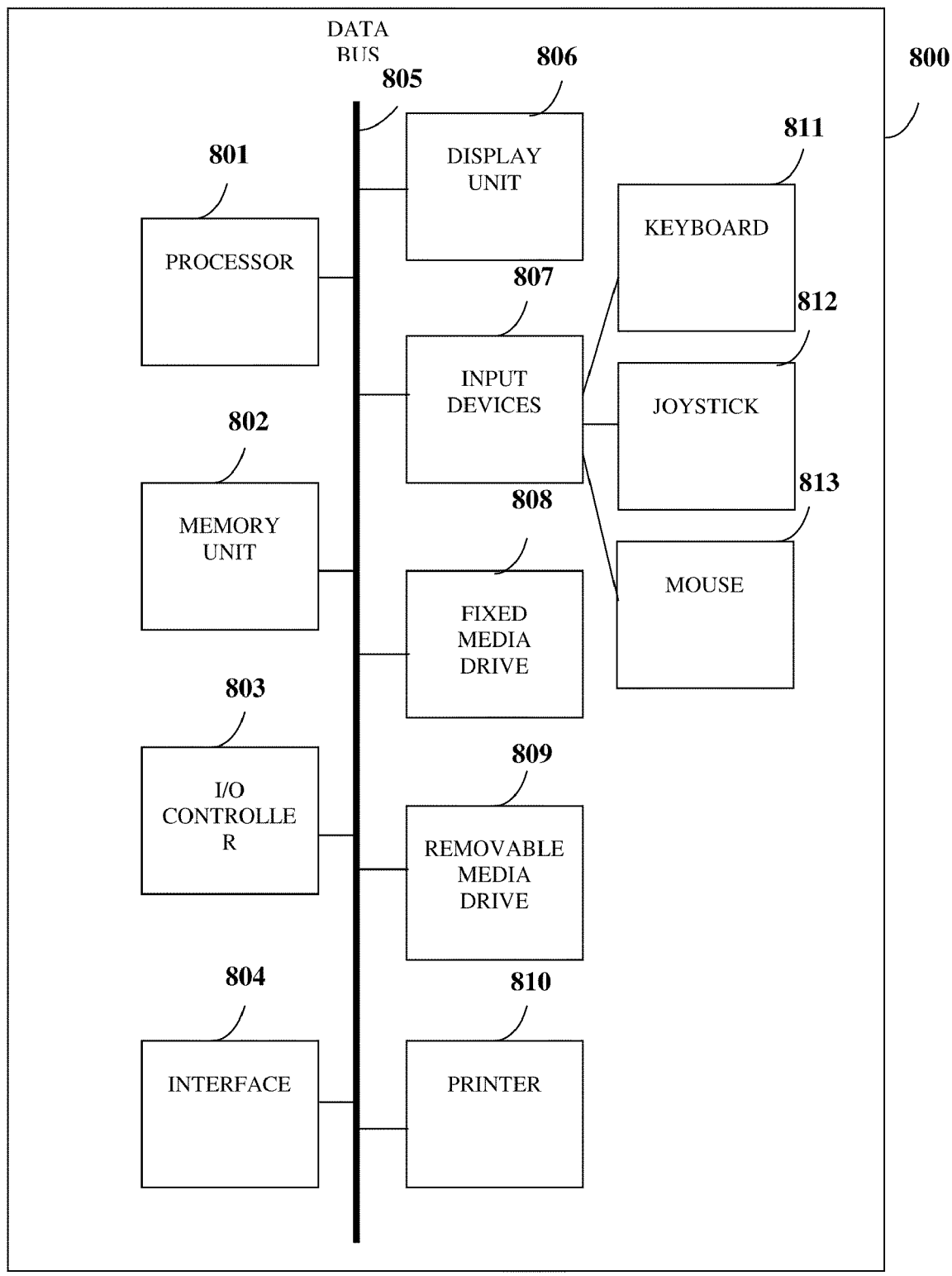
FIG. 8 exemplarily illustrates architecture of a computer system used for execution of an image aligning application.

FIG. 8 exemplarily illustrates architecture of a computer system 800 used for execution of the image aligning application 701. For purposes of illustration, the detailed description discloses the image aligning application 701 installed in the computer system 800, however the scope of the computer implemented method and system 700 disclosed herein is not limited to the image aligning application 701 being installed in the computer system 800 but may be extended to include the image aligning application 701 being installed on the image capture devices 702. The computer system 800 comprises a processor 801, a memory unit 802 for storing programs and data, an input/output (I/O) controller 803, and a display unit 806 communicating via a data bus 805. The memory unit 802 comprises a random access memory (RAM) and a read only memory (ROM). The computer system 800 comprises one or more input devices 807, for example, a keyboard 811 such as an alphanumeric keyboard, a mouse 813, a joystick 812, etc. The input/output (I/O) controller 803 controls the input and output actions performed by a user. The computer system 800 communicates with other computer systems through an interface 804, comprising, for example, a Bluetooth™ interface, an infrared (IR) interface, a WiFi interface, a universal serial bus interface (USB), a local area network (LAN) or wide area network (WAN) interface, etc.

The computer system 800 further comprises a fixed media drive 808 and a removable media drive 809 for receiving removable media. The computer system 800 further comprises output devices, for example, a printer 810 for receiving and reading digital data on a compact disk, a digital video disk or other medium. Computer applications or programs are used for operating the computer system 800. The programs are loaded onto the fixed media drive 808 and into the memory unit 802 of the computer system 800 via the removable media drive 809. Applications are executed by double clicking a related icon displayed on the display unit 806 using the mouse 813 or through other input devices 807. Further the computer system 800 employs an operating system for performing multiple tasks. The operating system manages execution of the image aligning application 701 provided on the computer system 800. The operating system further manages security of the computer system 800, peripheral devices connected to the computer system 800, and network connections. The operating system employed on the computer system 800 recognizes keyboard inputs of a user, output display, files and directories stored locally on the fixed media drive 808, for example, a hard drive. Different programs, for example, a web browser, an e-mail application, etc., initiated by the user are executed by the operating system with the help of the processor 801, for example, a central processing unit (CPU). The operating system monitors the use of the processor 801.

The image aligning application 701 is installed in the computer system 800 and the instructions are stored in the memory unit 802. The first image and the second image are transferred from the image capture devices 702 to the image aligning application 701 installed in the computer system 800 via the network 703 using the interface 804. A user initiates the execution of the image aligning application 701 by double clicking on the icon for image aligning application 701 on the display unit 806 or the execution of the image aligning application 701 is automatically initiated on installing the image aligning application 701. Instructions for executing the image aligning application 701 are retrieved by the CPU from various modules, for example, the input module 701a, the pixel point determination module 701b, the intra image correlation module 701c, the inter image correlation module 701d, the feature point pair selection module 701e, the aligning module 701f, the image modification module 701g, etc. of the image aligning application 701. The locations of the instructions in the modules are determined by a program counter (PC). The program counter stores a number that identifies the current position in the program of the image aligning application 701. The instructions fetched by the CPU from the program memory after being processed are decoded. The instructions are placed in an instruction register (IR) in the CPU. After processing and decoding, the CPU executes the instructions. The instructions comprise, for example, accepting the first image and the second image, determining at least one of one or more local maxima pixel points and one or more local minima pixel points in the first region in the first image and the second region in the second image based on predetermined statistical criteria, performing iterative intra image correlation, performing iterative inter image correlation, selecting a matching feature point pair from the determined best correlated feature point pairs, computing a sigmoid function and a reverse sigmoid function, aligning the first image and the second image, etc.

At the time of execution, the instructions stored in the instruction register are examined to determine the operations to be performed. The specified operation is then performed by the CPU. The operations include arithmetic and logic operations. The operating system performs multiple routines for performing a number of tasks required to assign input devices 807, output devices, and memory for execution of the image aligning application 701. The tasks performed by the operating system comprise assigning memory to the image aligning application 701 and data, moving data between memory 802 and disk units and handling input/output operations. The operating system performs the tasks on request by the operations and after performing the tasks, the operating system transfers the execution control back to the CPU. The CPU continues the execution to obtain one or more outputs. The outputs of the execution of the image aligning application 701 are displayed to the user on the display unit 806.

Figure 9B:
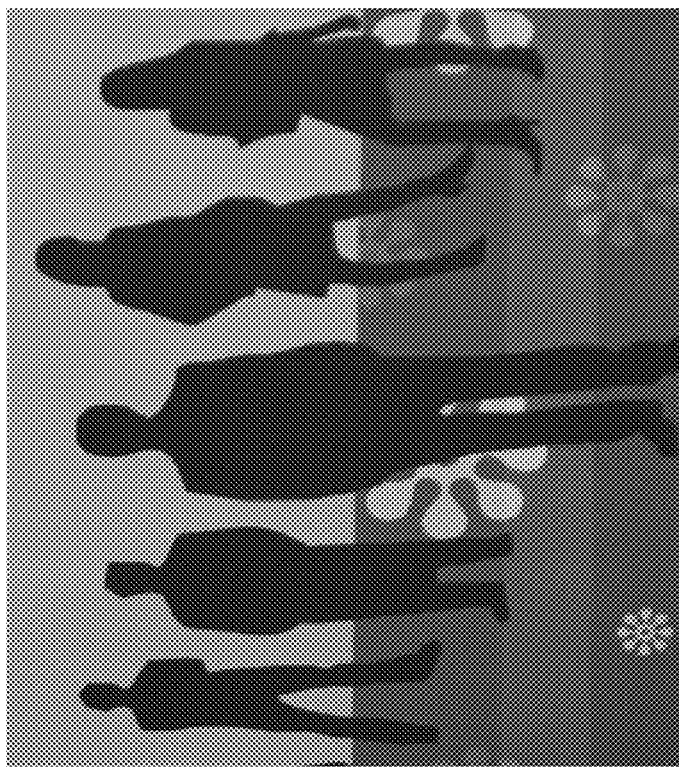
FIGS. 9A-9B exemplarily illustrate an overlapping first image and second image.
Figure 9A:
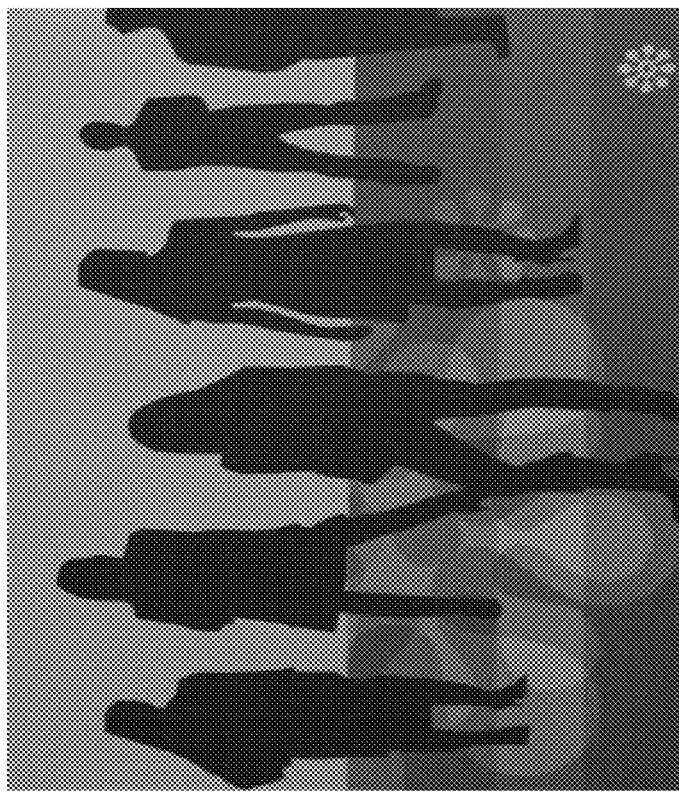
Figure 10A:
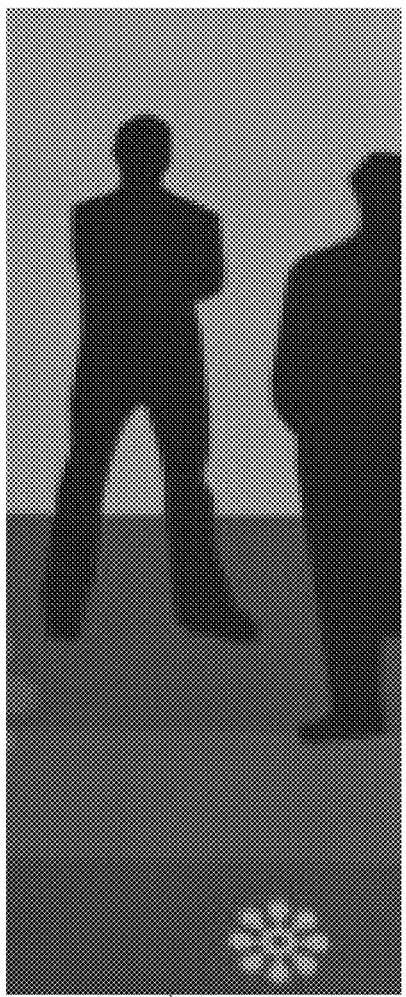
FIGS. 10A-10B exemplarily illustrate a first region of maximum overlap in the first image and a second region of maximum overlap in the second image.
Figure 10B:
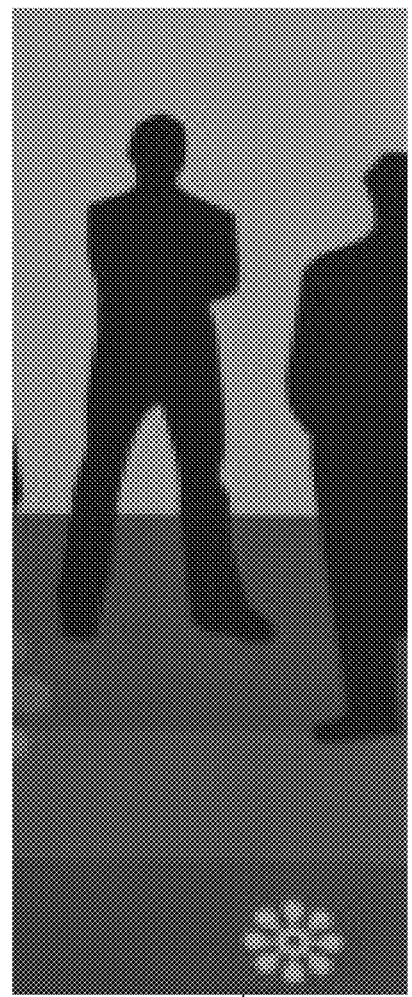
Figure 11A:
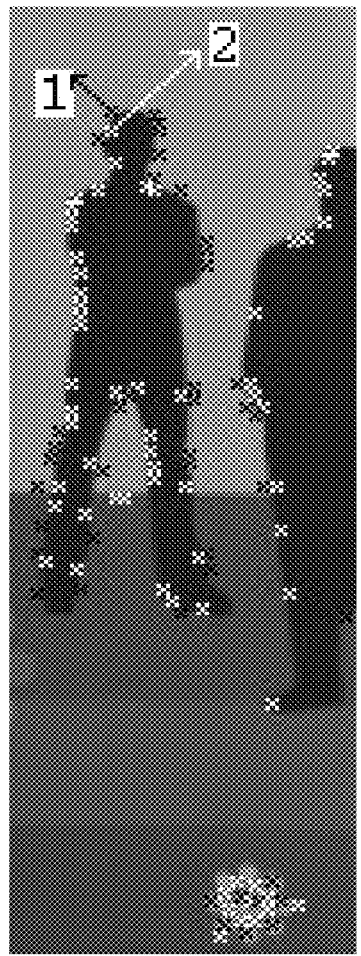
FIGS. 11A-11B exemplarily illustrate multiple local maxima pixel points and multiple local minima pixel points determined in the first region of maximum overlap in the first image and the second region of maximum overlap in the second image.
Figure 11B:
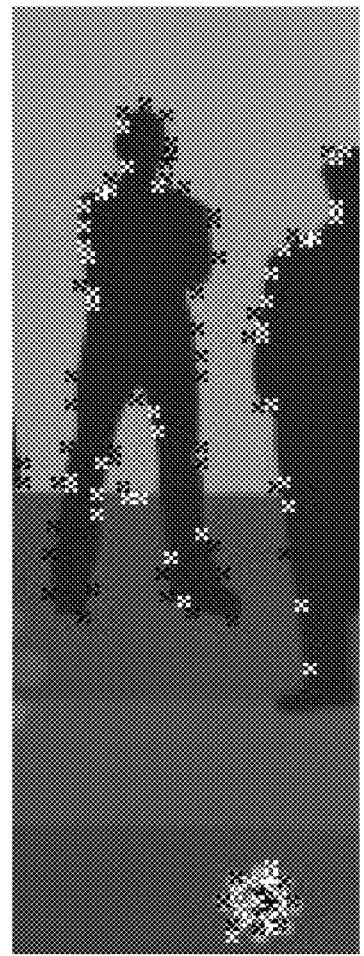

Consider an example of the computer implemented method and system 700 disclosed herein used for the creation of a panoramic image. FIGS. 9A-9B exemplarily illustrate an overlapping first image 901 and second image 902. A user intending to create the panoramic image using the first image 901 and the second image 902, transfers the first image 901 and the second image 902 to the image aligning application 701. The image aligning application 701 accepts the first image 901 and the second image 902 through the input module 701a. The first region in the first image 901 and the second region in the second image 902 for determining one or more local maxima pixel points and one or more local minima pixel points are a first region of maximum overlap 1001 in the first image 901 and a second region of maximum overlap 1002 in the second image 902 respectively. FIGS. 10A-10B exemplarily illustrate the first region of maximum overlap 1001 in the first image 901 and the second region of maximum overlap 1002 in the second image 902. The image aligning application 701 determines the first region of maximum overlap 1001 in the first image 901 and the second region of maximum overlap 1002 in the second image 902. The first region of maximum overlap 1001 and the second region of maximum overlap 1002 in combination constitute a region in common between the first image 901 and the second image 902 comprising a maximum number of similar discrete components. The image aligning application 701 determines multiple local maxima pixel points and local minima pixel points in the first region of maximum overlap 1001 and the second region of maximum overlap 1002 based on, for example, the absolute surrounding mean deviation values. FIGS. 11A-11B exemplarily illustrate the determined local maxima pixel points and the determined local minima pixel points.

Consider, for example, pixel point 1, and pixel point 2 in the first image 901 as exemplarily illustrated in FIG. 11A. The pixel point 1 possesses an intensity 149 and the pixel point 2 possesses an intensity 34. The intensities of the pixel point 1, the pixel point 2, and the multiple pixel points surrounding pixel point 1 and pixel point 2 are as follows:

147 147 148
147 149 145
146 143 106
92 36 34
70 34 35
53 35 34

Figure 12:
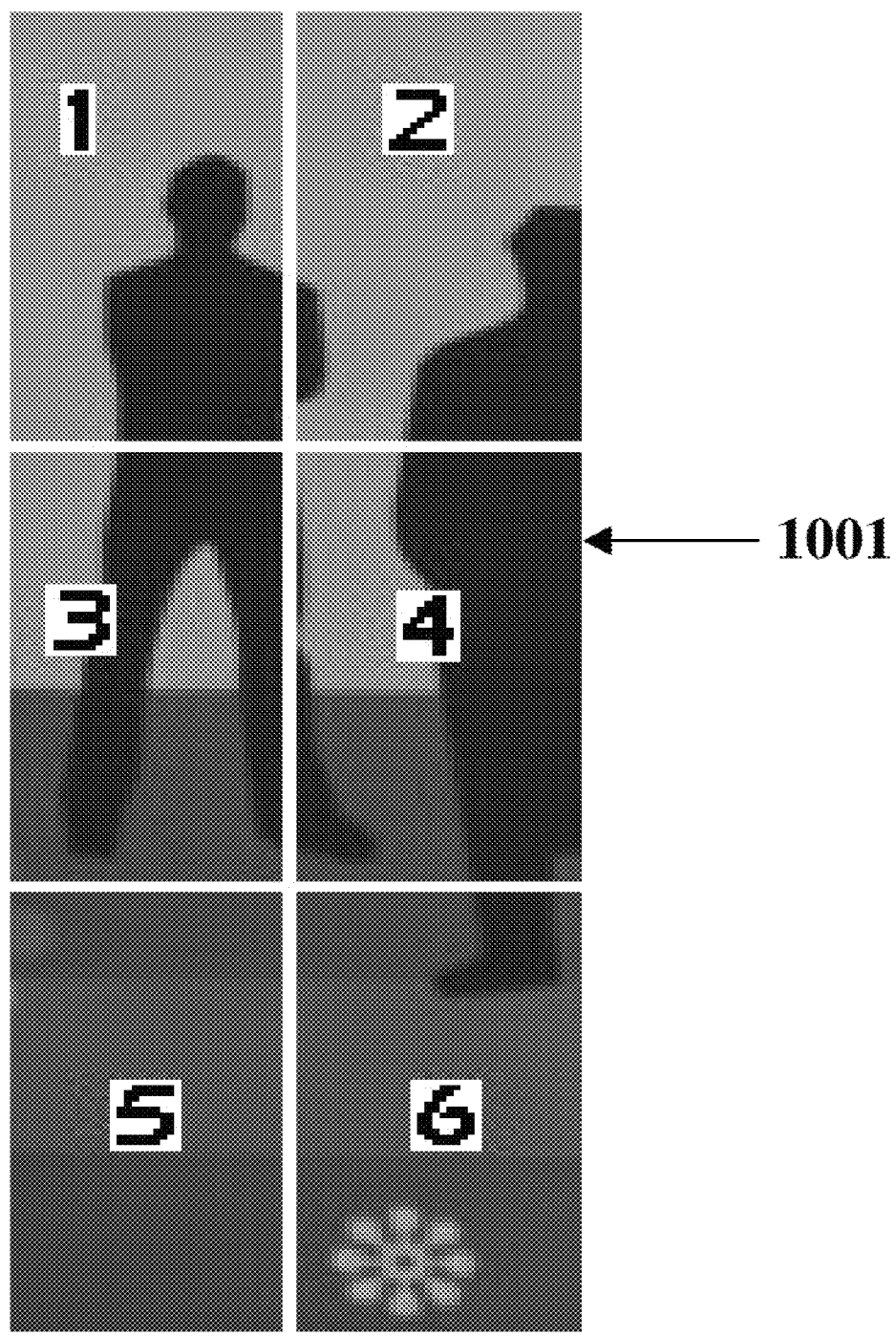
FIG. 12 exemplarily illustrates multiple blocks defined in the first region of maximum overlap in the first image.

For the purpose of illustration in this example, eight pixel points surrounding the pixel point 1 and the pixel point 2 in the immediate vicinity of the pixel point 1 and the pixel point 2 are considered for calculating the absolute surrounding mean deviation values; however the scope of the computer implemented method and system 700 disclosed herein is not limited to eight pixel points but may be extended to include multiple pixel points in the vicinity of the pixel point 1 and the pixel point 2. The pixel point 1 of intensity "149" possesses a value of intensity higher than the surrounding pixel points. The pixel point 2 of intensity "34" possesses a value of intensity lower than the surrounding pixel points. The image aligning application 701 determines pixel point 1 as one of the local maxima pixel points and pixel point 2 as one of the local minima pixel points. Similarly, the image aligning application 701 determines multiple local maxima pixel points and local minima pixel points in the first region of maximum overlap 1001 and the second region of maximum overlap 1002 as exemplarily illustrated in FIGS. 11A-11B. In FIGS. 11A-11B, the white crosses indicate the determined local minima pixel points and the black crosses indicate the determined local maxima pixel points. The image aligning application 701 defines multiple blocks in the first region of maximum overlap 1001 in the first image 901 as exemplarily illustrated in FIG. 12. The image aligning application 701 defines six blocks, for example, block 1, block 2, block 3, block 4, block 5, and block 6 of a predetermined size in the first region of maximum overlap 1001.

In this example, the image aligning application 701 performs iterative intra image correlation in a first mode. The image aligning application 701 performs the iterative intra image correlation within each of the blocks. Consider, for example, block 2. The image aligning application 701 determines, for example, ten local minima pixel points and three local maxima pixel points in block 2. The image aligning application 701 defines areas of predetermined sizes around each of the ten local minima pixel points and the three local maxima pixel points in block 2 for performing iterative intra image correlation. Consider an example where the image aligning application 701 correlates a defined area around the local minima pixel point, for example, (38,73) with the defined areas around the determined local minima pixel points, for example, (36,74), (36,76), (36,77), (43,71), (46, 72), (54,72), (58,68), (59,65), and (77,56) within block 2. The image aligning application 701 iterates the correlation for the predetermined sizes of the defined areas, for example, 3, 5, and 7, as exemplarily illustrated in FIG. 18. The image aligning application 701 determines one or more normalized correlation coefficients based on the correlation.

FIG. 18 exemplarily illustrates the resultant correlation coefficients determined by performing iterative intra image correlation for the local minima pixel point (38,73) with the other determined local minima pixel points (36,74), (36,76), (36,77), (43,71), (46, 72), (54,72), (58,68), (59,65), and (77, 56) within block 2 for the defined areas of different predetermined sizes around the determined local minima pixel points. The threshold values selected for each of the predetermined sizes is 0.875. If the normalized correlation coefficient for each of the determined local maxima pixel points or the determined local minima pixel points is greater than the selected threshold value, the image aligning application 701 terminates the correlation for the concerned local maxima pixel point or the local minima pixel point for different predetermined sizes of the defined areas. The image aligning application 701 does not consider the concerned local maxima pixel point or local minima pixel point for succeeding computations. In this example, since the normalized correlation coefficients for the local minima pixel points (43,71), (54,72), (58,68), and (59,65) is 1 which is greater than the threshold value of 0.875, as exemplarily illustrated in FIG.

18, the image aligning application 701 terminates successive iterations for the local minima pixel points (43, 71), (54,72), (58,68), and (59,65) for the predetermined sizes 5 and 7 as exemplarily illustrated in FIG. 18.

For each of the local minima pixel points, a resultant correlation coefficient is determined. The resultant correlation coefficient, in this example, is determined by calculating the mean of the normalized correlation coefficients. In this example, the resultant correlation coefficient represents a pair of local minima pixel points whose defined areas are correlated. For example, as exemplarily illustrated in FIG. 18, the resultant correlation coefficient 0.6133 represents the pair of local minima pixel points (38,73) and (36,74). Similarly, the image aligning application 701 performs iterative intra image correlation for the rest of the local maxima pixel points and the local minima pixel points within block 2 for determining multiple resultant correlation coefficients. The image aligning application 701 determines one or more best resultant correlation coefficients from the determined resultant correlation coefficients. FIG. 19 exemplarily illustrates the best resultant correlation coefficients determined for the determined local minima pixel points (36,74), (36,76), (36,77), (38,73), (43,71), (46,72), (54,72), (58,68), (59,65), and (77, 56) within block 2. The image aligning application 701 then determines 0.7862 as the best resultant correlation coefficient from the determined best resultant correlation coefficients for block 2. Similarly, the image aligning application 701 performs the iterative intra image correlation for block 1, block 3, block 4, block 5, and block 6 and determines the corresponding best resultant correlation coefficients.

FIG. 20 exemplarily illustrates the best resultant correlation coefficients determined for block 1, block 2, block 3, block 4, block 5, and block 6. The image aligning application 701 discards the blocks devoid of any local maxima pixel point or local minima pixel point or the blocks comprising correlation coefficients exceeding the threshold value. In this example, block 4 is discarded. The image aligning application 701 then determines a predetermined number of least correlated blocks from block 1, block 2, block 3, block 5, and block 6 using the determined best resultant correlation coefficients of block 1, block 2, block 3, block 5, and block 6. In this example, the image aligning application 701 selects block 2 and block 6 from the defined blocks as the least correlated blocks possessing the least resultant correlation coefficients 0.7862 and 0.7961 respectively.

Figure 13:
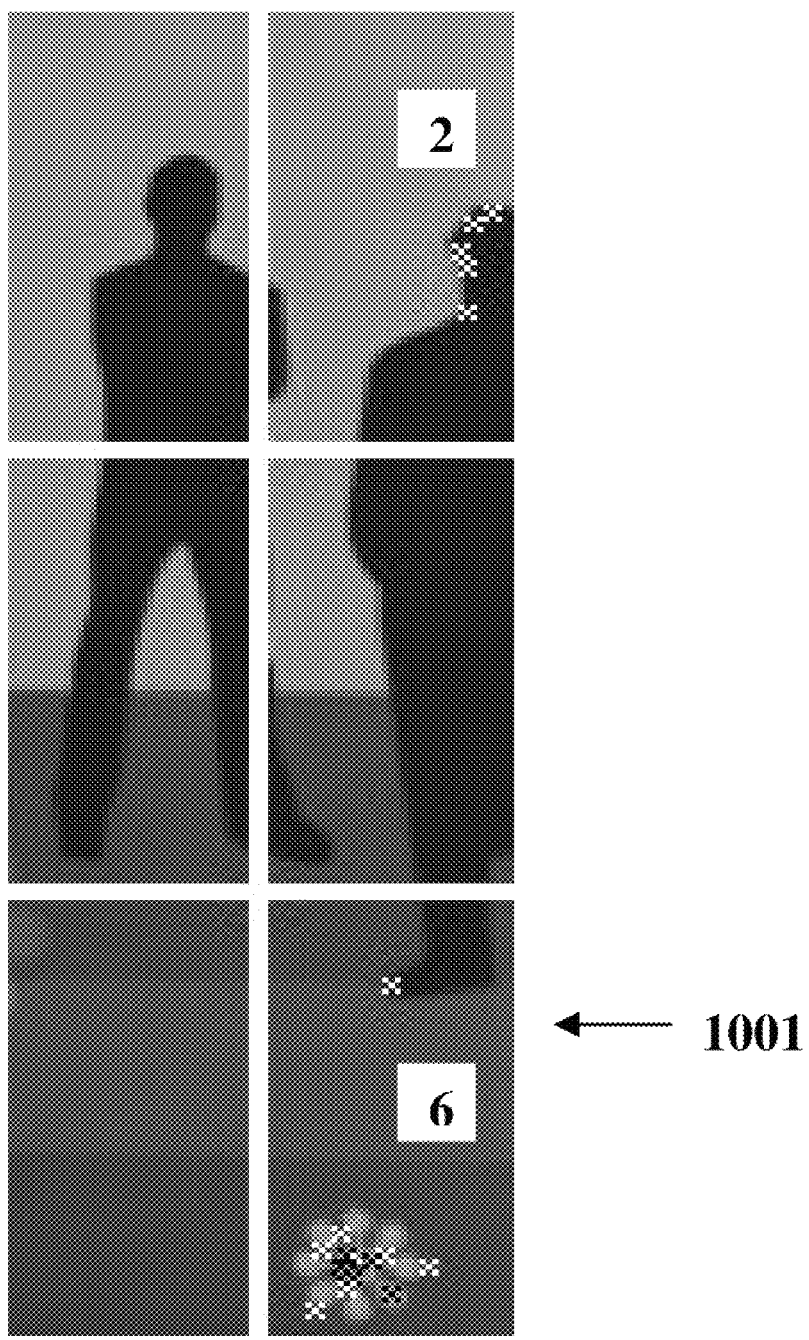
FIG. 13 exemplarily illustrates the least correlated blocks determined from among the defined blocks in the first region of maximum overlap in the first image.

The determined local maxima pixel points within the selected least correlated blocks are the least correlated local maxima pixel points and the determined local minima pixel points within the selected least correlated blocks are the least correlated local minima pixel points. The image aligning application 701 selects only some of the least correlated local maxima pixel points and the least correlated local minima pixel points within the least correlated blocks as the feature points for the next stage. In this example, the image aligning application 701 selects half of the total number of local maxima pixel points and local minima pixel points put together for the next stage. In this example, the local minima pixel point (38,73) is one of the feature points selected from the least correlated block 2. FIG. 13 exemplarily illustrates the least correlated blocks, namely block 2 and block 6, and the selected least correlated local maxima pixel points and the selected least correlated local minima pixel points within block 2 and block 6.

The image aligning application 701 determines the spatial coordinate of the selected feature point as (38,73). The image aligning application 701 defines a cell 1401 in the second region of maximum overlap 1002 in the second image 902 as exemplarily illustrated in FIG. 14B, corresponding to the determined spatial coordinate (38,73) of the selected feature point in the first region of maximum overlap 1001 as exemplarily illustrated in FIG. 14A. The defined cell 1401 comprises the determined local minima pixel points (36,76), (38, 74), (45,33), and (50,74) in the second image 902. The image aligning application 701 defines a first area of one of multiple predetermined sizes around the selected feature point (38, 73) in the first region 1001 and defines multiple second areas of the same predetermined size around the determined local minima pixel points within the defined cell 1401 in the second region 1002. The image aligning application 701 performs iterative inter image correlation for the selected feature point (38,73) in the first region 1001 with the determined local minima pixel points (36,76), (38,74), (45,33), and (50,74) in the second region 1002 by correlating the defined first area with each of the defined second areas. The image aligning application 701 determines one or more normalized correlation coefficients based on the correlation.

FIG. 21 exemplarily illustrates the resultant correlation coefficients obtained by performing iterative inter image correlation for the feature point (38,73). The image aligning application 701 selects a threshold value of 0.875 for each of the predetermined sizes of the defined first area. The image aligning application 701 discontinues the iteration if the normalized correlation coefficient between the two pixel points, for a particular predetermined size of the defined first area, is less than the threshold value for the particular predetermined size of the first area. The image aligning application 701 discontinues successive iterations for the local minima pixel points (36,76), (45,33), and (50,74) for the predetermined sizes 5 and 7 as their normalized correlation coefficients for the predetermined size 3 is less than the threshold value of 0.875 as exemplarily illustrated in FIG. 21. Only one of the local minima pixel points (38,74) passes all the three threshold values and obtains a resultant correlation coefficient of 0.9138.

FIG. 22 exemplarily illustrates the resultant correlation coefficients determined for each of the selected feature points. On determining multiple resultant correlation coefficients for a determined local maxima pixel point or a determined local minima pixel point, the image aligning application 701 selects a maximum determined resultant correlation coefficient as the best resultant correlation coefficient for the determined local maxima pixel point or the determined local minima pixel point. In this example, the image aligning application 701 selects the resultant correlation coefficient 0.9138 as the best resultant correlation coefficient for (38, 73) in the first image 901.

Similarly, the image aligning application 701 performs iterative inter image correlation for other selected feature points in the first image 901. During iterative inter image correlation, the image aligning application 701 discontinues iterations for the feature points whose normalized correlation coefficients do not exceed the threshold value.

Figure 15A:
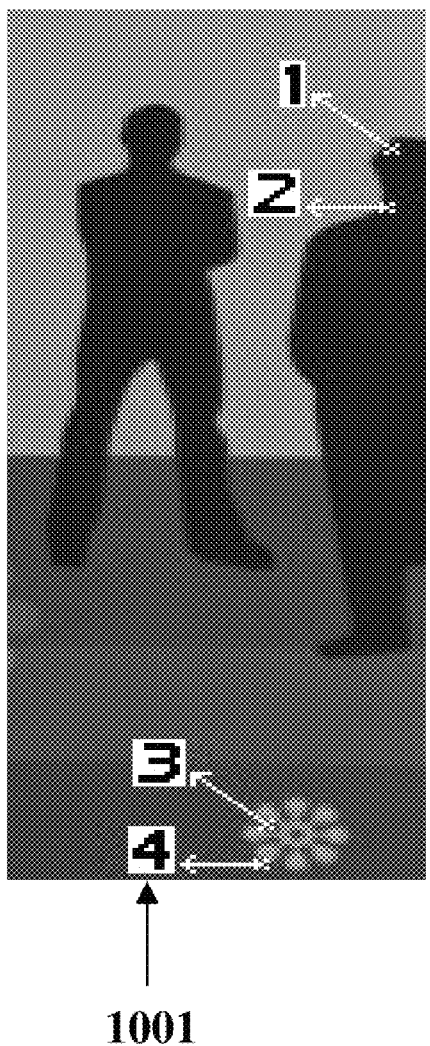
FIGS. 15A-15B exemplarily illustrate multiple feature points in the first region of maximum overlap in the first image, and multiple determined local maxima pixel points and determined local minima pixel points in the second region of maximum overlap in the second image determined after performing inter image correlation.
Figure 15B:
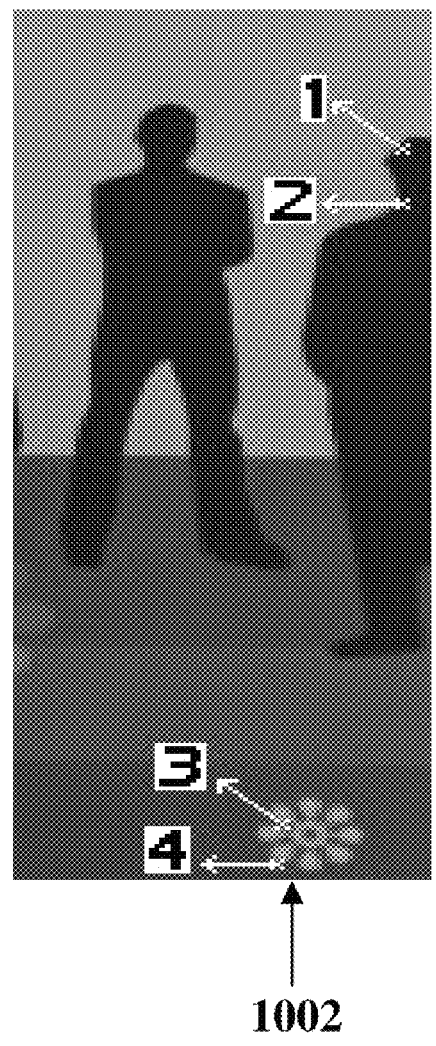

The image aligning application 701 determines the best correlated feature point pairs using the determined best resultant correlation coefficients. The best resultant correlation coefficient 0.9138 represents the selected feature point (38,73) in the first region 1001 in the first image 901 and the local minima pixel point (38,74) in the second region 1002 in the second image 902. The image aligning application 701 selects the feature point (38,73) in the first region 1001 in the first image 901 and the local minima pixel point (38,74) in the second region 1002 in the second image 902 as the best correlated feature point pair. FIGS. 15A-15B exemplarily illustrate the four best correlated feature point pairs in the first image 901 and the second image 902. From among the best correlated feature point pairs, the image aligning application 701 selects a matching feature point pair based on a probability analysis. The image aligning application 701 calculates the probability of occurrence of the vertical offset value of each of the determined best correlated feature point pairs. FIG. 23 exemplarily illustrates a set of vertical offset values of the best correlated feature point pairs calculated by the image aligning application 701. The image aligning application 701 groups the determined best correlated feature point pairs into one or more groups based on the calculated probability. FIG. 24 exemplarily illustrates the calculated probabilities of the best correlated feature point pairs.

Figure 16A:
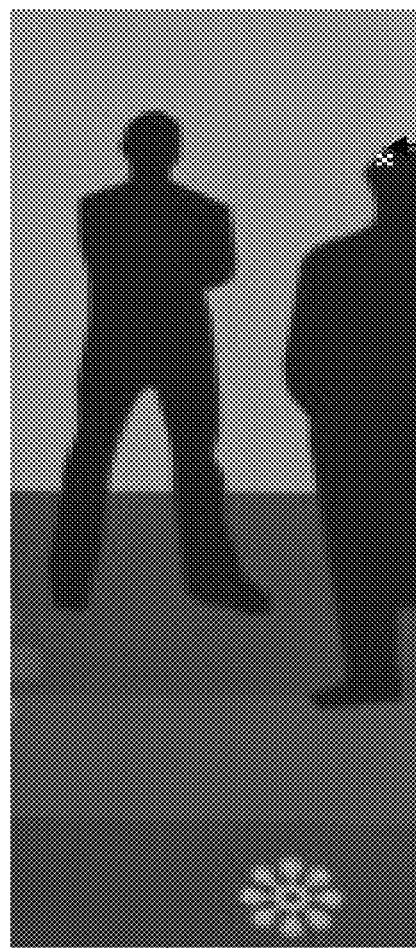
FIGS. 16A-16B exemplarily illustrate a matching feature point pair in the first region of maximum overlap in the first image and the second region of maximum overlap in the second image determined by grouping the best correlated feature point pairs based on the probability of occurrence of vertical offsets and selecting the matching feature point pair from a highest probability group.
Figure 16B:
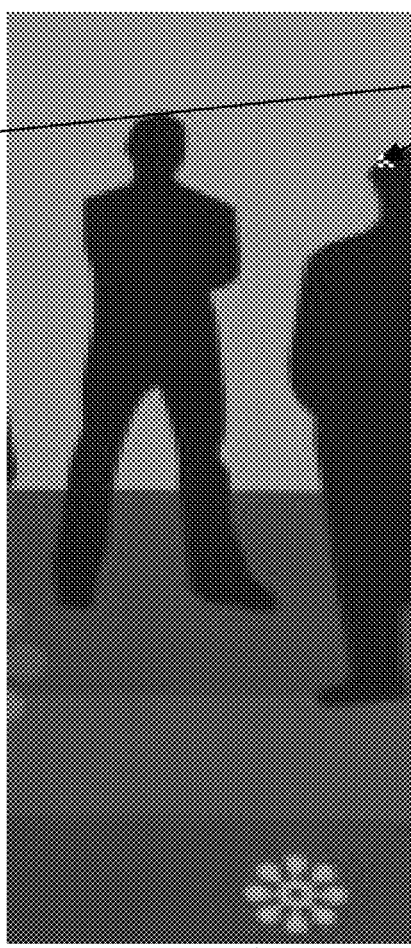
Figure 17:
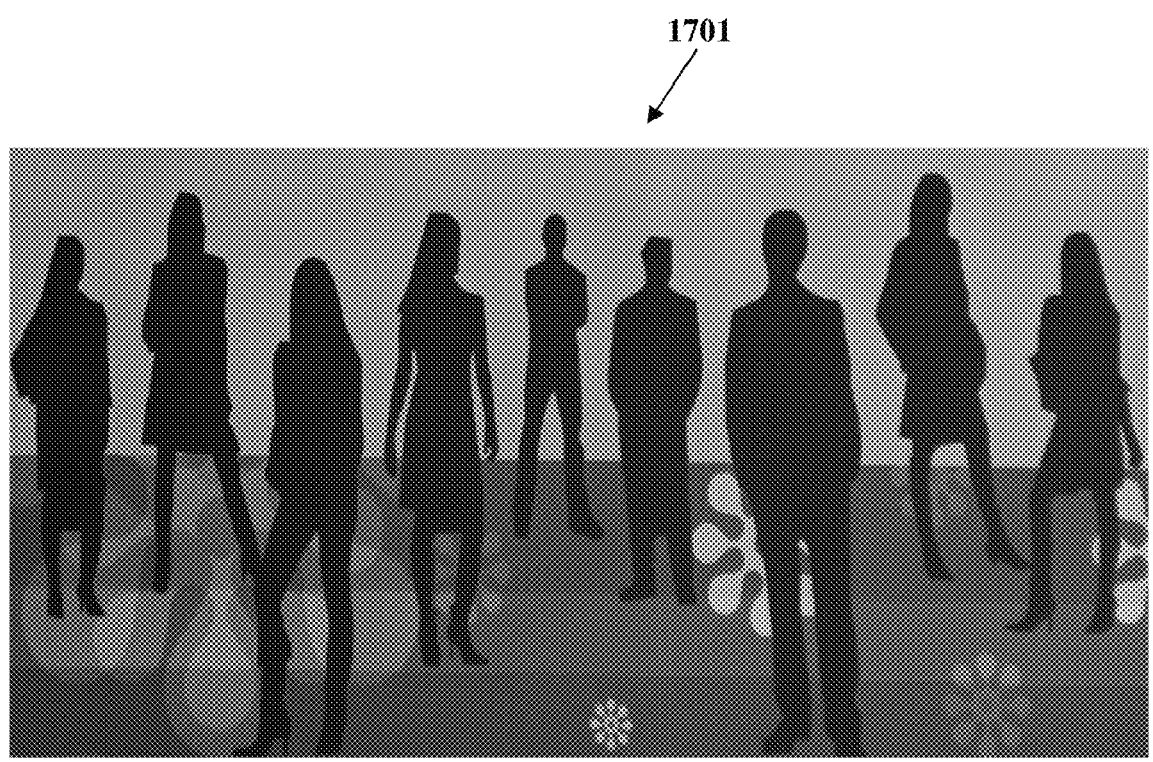
FIG. 17 exemplarily illustrates a panoramic image created by aligning the first image and the second image.

As illustrated in FIGS. 15A-15B, the image aligning application 701 groups the best correlated feature point pairs 1, 3, and 4 together into a first group and the best correlated feature point pair 2 in a second group. From among the first group and the second group, the image aligning application 701 selects the first group comprising a maximum number of the best correlated feature point pairs as a highest probability group. The image aligning application 701 selects the best correlated feature point pair 1 as the matching feature point pair 1601 from the highest probability group. FIGS. 16A-16B exemplarily illustrate the selected matching feature point pair 1601 in the first region of maximum overlap 1001 in the first image 901 and the second region of maximum overlap 1002 in the second image 902. The image aligning application 701 superimposes the first image 901 and the second image 902 by concurrently positioning the selected matching feature point pair 1601 over one another for obtaining a superimposed image. The image aligning application 701 computes a width of overlap for an overlapping region in the superimposed image. The image aligning application 701 defines a sigmoid function for the second image 902 for the computed width of overlap. Furthermore, the image aligning application 701 defines a reverse sigmoid function for the first image 901 for the computed width of overlap. The image aligning application 701 applies the sigmoid function and the reverse sigmoid function to the second image 902 and the first image 901 respectively at the overlapping region in the superimposed image and creates the panoramic image 1701 as exemplarily illustrated in FIG. 17.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:
1. A computer implemented method of aligning a plurality of overlapping images in real time using translation invariant feature matching, comprising the steps of:
  capturing said overlapping images comprising a first image and a second image using one or more image capture devices, wherein each of said overlapping images overlaps an adjacent image of said overlapping images;
  determining at least one of one or more local maxima pixel points and one or more local minima pixel points in a first region in said first image and a second region in said second image based on predetermined statistical criteria;

performing iterative intra image correlation for at least one of said determined one or more local maxima pixel points and said determined one or more local minima pixel points in said first image for selecting a predetermined number of feature points comprising at least one of one or more least correlated local maxima pixel points and one or more least correlated local minima pixel points, wherein said iterative intra image correlation is performed in one of a first mode and a second mode;

performing iterative inter image correlation for said selected feature points, for determining a predetermined number of best correlated feature point pairs, wherein each of said determined best correlated feature point pairs comprises one of said selected feature points in said first image and one of: one of said determined one or more local maxima pixel points and one of said determined one or more local minima pixel points in said second image;

selecting a matching feature point pair from said determined best correlated feature point pairs; and aligning said first image and said second image using said selected matching feature point pair.

2. The computer implemented method of claim 1, wherein said first mode of performing said iterative intra image correlation comprises the steps of:

defining one or more blocks in said first region in said first image, wherein said one or more blocks are of a plurality of predetermined sizes;

defining one of a plurality of areas of one of a plurality of predetermined sizes around each of said determined one or more local maxima pixel points and said determined one or more local minima pixel points within each of said defined one or more blocks;

correlating each of said defined areas around each of said determined one or more local maxima pixel points with said defined areas around said determined one or more local maxima pixel points, and correlating each of said defined areas around each of said determined one or more local minima pixel points with said defined areas around said determined one or more local minima pixel points, within each of said defined one or more blocks in said first region, wherein said correlation is iterated for said predetermined sizes of said defined areas, wherein number of said iterations of said correlation is determined by a threshold value;

determining one or more resultant correlation coefficients based on said correlation, wherein each of said determined one or more resultant correlation coefficients represents one of a pair of local maxima pixel points whose defined areas are correlated and a pair of local minima pixel points whose defined areas are correlated;

determining one or more best resultant correlation coefficients from said determined one or more resultant correlation coefficients, wherein each of said determined one or more best resultant correlation coefficients represents one of: one of said determined one or more local maxima pixel points and one of said determined one or more local minima pixel points;

determining a best resultant correlation coefficient from said determined one or more best resultant correlation coefficients within each of said defined one or more blocks, wherein said determined best resultant correlation coefficient represents one of said defined one or more blocks;

determining a predetermined number of least correlated blocks from said defined one or more blocks using said determined best resultant correlation coefficient of each of said defined one or more blocks; and selecting said predetermined number of feature points comprising at least one of: one or more least correlated local maxima pixel points and one or more least correlated local minima pixel points from said determined least correlated blocks.

3. The computer implemented method of claim 1, wherein said second mode of performing said iterative intra image correlation, comprises the steps of:

defining one of a plurality of areas of one of a plurality of predetermined sizes around each of said determined one or more local maxima pixel points and said determined one or more local minima pixel points in said first region in said first image;

correlating each of said defined areas around each of said determined one or more local maxima pixel points with said defined areas around said determined one or more local maxima pixel points in said first region, and correlating each of said defined areas around each of said determined one or more local minima pixel points with said defined areas around said determined one or more local minima pixel points in said first region, wherein said correlation is iterated for said predetermined sizes of said defined areas, wherein number of said iterations of said correlation is determined by a threshold value;

determining one or more resultant correlation coefficients based on said correlation, wherein each of said determined one or more resultant correlation coefficients represents one of a pair of local maxima pixel points whose defined areas are correlated and a pair of local minima pixel points whose defined areas are correlated;

determining one or more best resultant correlation coefficients from said determined one or more resultant correlation coefficients, wherein each of said determined one or more best resultant correlation coefficients represents one of: one of said determined one or more local maxima pixel points and one of said determined one or more local minima pixel points; and selecting said predetermined number of feature points comprising at least one of: one or more least correlated local maxima pixel points and one or more least correlated local minima pixel points, using said determined one or more best resultant correlation coefficients.

4. The computer implemented method of claim 1, wherein the step of performing said iterative inter image correlation comprises the steps of:

defining a cell in said second region in said second image corresponding to spatial coordinates of each of said selected feature points in said first region in said first image;

defining one of a plurality of first areas of one of a plurality of predetermined sizes around each of said selected feature points in said first region;

defining one of a plurality of second areas of said one of said predetermined sizes around each of one of said determined one or more local maxima pixel points and said determined one or more local minima pixel points within each said defined cell in said second region in said second image;

correlating each of said defined first areas in said first region with one or more of said defined second areas within each said defined cell in said second region based on spatial coordinates of each of said selected feature points, wherein said correlation is iterated for said predetermined sizes, wherein number of said iterations of said correlation is determined by a threshold value;

determining one or more resultant correlation coefficients based on said correlation, wherein each of said determined one or more resultant correlation coefficients represents one of said selected feature points and one of: one of said determined one or more local maxima pixel points and one of said determined one or more local minima pixel points in said second image;

determining one or more best resultant correlation coefficients from said determined one or more resultant correlation coefficients, wherein each of said determined one or more best resultant correlation coefficients represents one of said selected feature points and one of: one of said determined one or more local maxima pixel points and one of said determined one or more local minima pixel points in said second image; and determining a predetermined number of best correlated feature point pairs using said determined one or more best resultant correlation coefficients.

5. The computer implemented method of claim 4, wherein each of said defined first areas is coincided with one of said defined second areas based on said spatial coordinates of said selected feature points prior to the step of said correlation during performing said iterative inter image correlation, wherein said coinciding compensates for translation between said first image and said second image.

6. The computer implemented method of claim 1, wherein the step of selecting said matching feature point pair comprises the steps of:
calculating probability of occurrence of one of a vertical offset value and a horizontal offset value, of each of said determined best correlated feature point pairs;
grouping said determined best correlated feature point pairs into one or more groups based on said calculated probability;
selecting a group comprising a maximum number of said best correlated feature point pairs from among said one or more groups; and
selecting said matching feature point pair from said selected group.

7. The computer implemented method of claim 1, wherein said predetermined statistical criteria comprise an absolute surrounding mean deviation of said determined one or more local maxima pixel points and said determined one or more local minima pixel points.

8. The computer implemented method of claim 1, wherein said one or more image capture devices are positioned relative to one another in positions restraining rotation between said first image and said second image.

9. The computer implemented method of claim 1, wherein each of said iterative intra image correlation and said iterative inter image correlation is a zero offset correlation.

10. The computer implemented method of claim 1, further comprising the step of modifying said first image and said second image prior to said determination of one or more local maxima pixel points and said one or more local minima pixel points in said first image and said second image for minimizing effects of at least one of barrel distortion and noise on said first image and said second image.

11. The computer implemented method of claim 1, wherein said first image and said second image are aligned for creating a panoramic image, wherein said first region and said second region for determining said one or more local maxima pixel points and said one or more local minima pixel points are a first region of maximum overlap in said first image and a second region of maximum overlap in said second image respectively, and wherein the step of creating said panoramic image comprises the steps of:
superimposing said first image and said second image by concurrently positioning said selected matching feature point pair for obtaining a superimposed image;
computing a width of an overlapping region in said superimposed image;
defining a sigmoid function for said second image for said computed width;
defining a reverse sigmoid function for said first image for said computed width; and
applying said sigmoid function and said reverse sigmoid function to said second image and said first image respectively at said overlapping region for creating said panoramic image.

12. The computer implemented method of claim 1, wherein said first image and said second image are aligned for creating a stabilized image, wherein said first image and said second image are captured using one of said one or more image capture devices, wherein said first image and said second image comprise inter image jitter, and wherein said first region in said first image and said second region in said second image for determining said one or more local maxima pixel points and said one or more local minima pixel points are entire region of said first image and entire region of said second image respectively, and wherein said step of creating said stabilized image comprises the step of displacing said second image with respect to said first image using said selected matching feature point pair for compensating for said inter image jitter.

13. A computer implemented system for aligning a plurality of overlapping images in real time using translation invariant feature matching, comprising:
one or more image capture devices for capturing said overlapping images comprising a first image and a second image; and
an image aligning application for aligning said captured overlapping images comprising:
an input module for accepting said captured overlapping images from said one or more image capture devices via a network;
a pixel point determination module for determining at least one of one or more local maxima pixel points and one or more local minima pixel points in a first region in said first image and a second region in said second image based on predetermined statistical criteria;
an intra image correlation module for performing iterative intra image correlation for at least one of said determined one or more local maxima pixel points and said determined one or more local minima pixel points in said first image for selecting a predetermined number of feature points comprising at least one of one or more least correlated local maxima pixel points and one or more least correlated local minima pixel points;
an inter image correlation module for performing iterative inter image correlation for said selected feature points, for determining a predetermined number of best correlated feature point pairs, wherein each of said determined best correlated feature point pairs comprises one of said selected feature points in said first image and one of: one of said determined one or more local maxima pixel points and one of said determined one or more local minima pixel points in said second image;

a feature point pair selection module for selecting a matching feature point pair from said determined best correlated feature point pairs; and an aligning module for aligning said first image and said second image using said selected matching feature point pair.

14. The computer implemented system of claim 13, wherein said intra image correlation module performs the steps of:

defining one or more blocks in said first region in said first image, wherein said one or more blocks are of a plurality of predetermined sizes;

defining one of a plurality of areas of one of a plurality of predetermined sizes around each of said determined one or more local maxima pixel points and said determined one or more local minima pixel points within each of said defined one or more blocks;

correlating each of said defined areas around each of said determined one or more local maxima pixel points with said defined areas around said determined one or more local maxima pixel points, and correlating each of said defined areas around each of said determined one or more local minima pixel points with said defined areas around said determined one or more local minima pixel points, within each of said defined one or more blocks in said first region, wherein said correlation is iterated for said predetermined sizes of said defined areas, wherein number of said iterations of said correlation is determined by a threshold value;

determining one or more resultant correlation coefficients based on said correlation, wherein each of said determined one or more resultant correlation coefficients represents one of a pair of local maxima pixel points whose defined areas are correlated and a pair of local minima pixel points whose defined areas are correlated;

determining one or more best resultant correlation coefficients from said determined one or more resultant correlation coefficients, wherein each of said determined one or more best resultant correlation coefficients represents one of: one of said determined one or more local maxima pixel points and one of said determined one or more local minima pixel points;

determining a best resultant correlation coefficient from said determined one or more best resultant correlation coefficients within each of said defined one or more blocks, wherein said determined best resultant correlation coefficient represents one of said defined one or more blocks;

determining a predetermined number of least correlated blocks from said defined one or more blocks using said determined best resultant correlation coefficient of each of said defined one or more blocks; and selecting said predetermined number of feature points comprising at least one of: one or more least correlated local maxima pixel points and one or more least correlated local minima pixel points from said determined least correlated blocks.

15. The computer implemented system of claim 13, wherein said intra image correlation module performs the steps of:

defining one of a plurality of areas of one of a plurality of predetermined sizes around each of said determined one or more local maxima pixel points and said determined one or more local minima pixel points in said first region in said first image;

correlating each of said defined areas around each of said determined one or more local maxima pixel points with said defined areas around said determined one or more local maxima pixel points in said first region, and correlating each of said defined areas around each of said determined one or more local minima pixel points with said defined areas around said determined one or more local minima pixel points in said first region, wherein said correlation is iterated for said predetermined sizes of said defined areas, wherein number of said iterations of said correlation is determined by a threshold value;

determining one or more resultant correlation coefficients based on said correlation, wherein each of said determined one or more resultant correlation coefficients represents one of a pair of local maxima pixel points whose defined areas are correlated and a pair of local minima pixel points whose defined areas are correlated;

determining one or more best resultant correlation coefficients from said determined one or more resultant correlation coefficients, wherein each of said determined one or more best resultant correlation coefficients represents one of: one of said determined one or more local maxima pixel points and one of said determined one or more local minima pixel points; and selecting said predetermined number of feature points comprising at least one of: one or more least correlated local maxima pixel points and one or more least correlated local minima pixel points, using said determined one or more best resultant correlation coefficients.

16. The computer implemented system of claim 13, wherein said inter image correlation module performs the steps of:

defining a cell in said second region in said second image corresponding to spatial coordinates of each of said selected feature points in said first region in said first image;

defining one of a plurality of first areas of one of a plurality of predetermined sizes around each of said selected feature points in said first region;

defining one of a plurality of second areas of said one of said predetermined sizes around each of one of said determined one or more local maxima pixel points and said determined one or more local minima pixel points within each said defined cell in said second region in said second image;

correlating each of said defined first areas in said first region with one or more of said defined second areas within each said defined cell in said second region based on spatial coordinates of each of said selected feature points, wherein said correlation is iterated for said predetermined sizes, wherein number of said iterations of said correlation is determined by a threshold value;

determining one or more resultant correlation coefficients based on said correlation, wherein each of said determined one or more resultant correlation coefficients represents one of said selected feature points and one of: one of said determined one or more local maxima pixel points and one of said determined one or more local minima pixel points in said second image;

determining one or more best resultant correlation coefficients from said determined one or more resultant correlation coefficients, wherein each of said determined one or more best resultant correlation coefficients represents one of said selected feature points and one of: one of said determined one or more local maxima pixel points and one of said determined one or more local minima pixel points in said second image; and determining a predetermined number of best correlated feature point pairs using said determined one or more best resultant correlation coefficients.

17. The computer implemented system of claim 13, wherein said feature point pair selection module performs the steps of:
    calculating probability of occurrence of one of a vertical offset value and a horizontal offset value, of each of said determined best correlated feature point pairs;
    grouping said determined best correlated feature point pairs into one or more groups based on said calculated probability;
    selecting a group comprising a maximum number of said best correlated feature point pairs from among said one or more groups; and
    selecting said matching feature point pair from said selected group.

18. The computer implemented system of claim 13, wherein said aligning module creates a panoramic image using said first image and said second image captured using said one or more image capture devices, wherein said first region and said second region for determining said one or more local maxima pixel points and said one or more local minima pixel points are a first region of maximum overlap in said first image and a second region of maximum overlap in said second image respectively.

19. The computer implemented system of claim 18, wherein said aligning module creates said panoramic image by performing the steps of:
    superimposing said first image and said second image by concurrently positioning said selected matching feature point pair for obtaining a superimposed image;
    computing a width of an overlapping region in said superimposed image;
    defining a sigmoid function for said second image for said computed width;
    defining a reverse sigmoid function for said first image for said computed width; and
    applying said sigmoid function and said reverse sigmoid function to said second image and said first image respectively at said overlapping region for creating said panoramic image.

20. The computer implemented system of claim 13, wherein said aligning module creates a stabilized image from said first image and said second image captured using one of said one or more image capture devices, wherein said first image and said second image comprises an inter image jitter, and wherein said first region in said first image and said second region in said second image for determining said one or more local maxima pixel points and said one or more local minima pixel points are entire region of said first image and entire region of said second image respectively.

21. The computer implemented system of claim 20, wherein said aligning module creates said stabilized image by displacing said second image with respect to said first image using said selected matching feature point pair for compensating for said inter image jitter.

22. The computer implemented system of claim 13, wherein said image aligning application further comprises an image modification module for modifying said first image and said second image prior to said determination of one or more local maxima pixel points and said one or more local minima pixel points in said first image and said second image for minimizing effects of at least one of barrel distortion and noise on said first image and said second image.

23. A computer program product comprising computer executable instructions embodied in a computer-readable medium, wherein said computer program product comprises:
    a first computer parsable program code for accepting a plurality of overlapping images comprising a first image and a second image captured using one or more image capture devices via a network;
    a second computer parsable program code for determining at least one of one or more local maxima pixel points and one or more local minima pixel points in a first region in said first image and a second region in said second image based on predetermined statistical criteria;
    a third computer parsable program code for performing iterative intra image correlation for at least one of said determined one or more local maxima pixel points and said determined one or more local minima pixel points in said first image for selecting a predetermined number of feature points comprising at least one of one or more least correlated local maxima pixel points and one or more least correlated local minima pixel points;
    a fourth computer parsable program code for performing iterative inter image correlation for said selected feature points, for determining a predetermined number of best correlated feature point pairs, wherein each of said determined best correlated feature point pairs comprises one of said selected feature points in said first image and one of: one of said determined one or more local maxima pixel points and one of said determined one or more local minima pixel points in said second image;
    a fifth computer parsable program code for selecting a matching feature point pair from said determined best correlated feature point pairs; and
    a sixth computer parsable program code for aligning said first image and said second image using said selected matching feature point pair.

24. The computer program product of claim 23, further comprising a seventh computer parsable program code for creating a panoramic image using said first image and said second image captured using said one or more image capture devices, wherein said first region and said second region for determining said one or more local maxima pixel points and said one or more local minima pixel points is a first region of maximum overlap in said first image and a second region of maximum overlap in said second image respectively.

25. The computer program product of claim 23, further comprising an eighth computer parsable program code for creating a stabilized image from said first image and said second image captured using one of said one or more image capture devices, wherein said first image and said second image comprises inter image jitter, and wherein said first region in said first image and said second region in said second image for determining said one or more local maxima pixel points and said one or more local minima pixel points are entire region of said first image and entire region of said second image respectively.

* * * * *